(12) United States Patent
Zhong et al.

(10) Patent No.: US 11,108,477 B2
(45) Date of Patent: Aug. 31, 2021

(54) METHOD AND APPARATUS FOR DETERMINING BROADCAST BEAM WEIGHTED VALUE IN WIRELESS COMMUNICATIONS SYSTEM

(71) Applicant: Huawei Technologies Co., Ltd., Shenzhen (CN)

(72) Inventors: Zhimeng Zhong, Shanghai (CN); Jianyao Zhao, Shanghai (CN); Di Feng, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 35 days.

(21) Appl. No.: 16/681,731

(22) Filed: Nov. 12, 2019

(65) Prior Publication Data
US 2020/0083971 A1  Mar. 12, 2020

Related U.S. Application Data

(63) Continuation of application No. PCT/CN2017/084127, filed on May 12, 2017.

(51) Int. Cl.
*H04B 17/318* (2015.01)
*H04B 7/06* (2006.01)

(52) U.S. Cl.
CPC ......... *H04B 17/318* (2015.01); *H04B 7/0617* (2013.01)

(58) Field of Classification Search
CPC .. H04B 7/0617; H04B 7/0695; H04B 17/318; H04W 52/242
See application file for complete search history.

(56) References Cited

U.S. PATENT DOCUMENTS 10,257,733 B2 *  4/2019  Lysejko ............... H04W 24/10
10,784,946 B2 *  9/2020  Zhang .................. H04B 7/0695
(Continued)

FOREIGN PATENT DOCUMENTS

CN       1531354 A    9/2004
CN     101090301 A   12/2007
(Continued)

OTHER PUBLICATIONS

Huawei, Hisilicon, "5G NR coexistence calibration in dense urban scenario," 3GPP TSG RAN WG4 Meeting #81, Reno, USA, R4-1609408, total 10 pages, 3rd Generation Partnership Project, Valbonne, France (Nov. 2016).

*Primary Examiner* — Melanie Jagannathan
(74) *Attorney, Agent, or Firm* — Leydig, Voit & Mayer, Ltd.

(57) ABSTRACT

A method and an apparatus for determining a broadcast beam weighted value are provided. The method includes: obtaining an angle path loss spectrum of a target cell at a current moment, where the angle path loss spectrum includes signal path loss values of a target base station in the target cell in a plurality of directions; determining a beam angle power spectrum based on the angle path loss spectrum, where the beam angle power spectrum includes signal transmit powers of the target base station in the plurality of directions, and in the beam angle power spectrum, a signal transmit power in a direction with a relatively large signal path loss value in the angle path loss spectrum is relatively large; determining a broadcast beam weighted value based on the beam angle power spectrum; and forming a target broadcast beam based on the broadcast beam weighted value.

17 Claims, 12 Drawing Sheets

(56) References Cited

U.S. PATENT DOCUMENTS

| | | | |
|---|---|---|---|
| 2005/0267677 A1* | 12/2005 | Poykko | G01S 5/0263 |
| | | | 701/408 |
| 2010/0298015 A1 | 11/2010 | Medbo et al. | |
| 2013/0102345 A1 | 4/2013 | Jung | |
| 2014/0057638 A1* | 2/2014 | Carey | H04W 16/18 |
| | | | 455/446 |
| 2015/0043538 A1* | 2/2015 | Xu | H04W 76/15 |
| | | | 370/332 |
| 2016/0380363 A1* | 12/2016 | Logothetis | 343/853 |
| 2016/0381591 A1* | 12/2016 | Lysejko | H01Q 1/246 |
| | | | 370/252 |
| 2017/0367014 A1* | 12/2017 | Bergstrom | H04W 64/00 |
| 2018/0205421 A1* | 7/2018 | Park | G01S 5/0036 |
| 2019/0199457 A1* | 6/2019 | Chopra | H04B 17/318 |
| 2020/0106582 A1* | 4/2020 | Jalali | H04L 5/0048 |

FOREIGN PATENT DOCUMENTS

| | | |
|---|---|---|
| CN | 101848021 A | 9/2010 |
| CN | 103782524 A | 5/2014 |
| CN | 105322993 A | 2/2016 |
| CN | 103891161 B | 5/2017 |
| JP | 2010533391 A | 10/2010 |
| JP | 2012156589 A | 8/2012 |

* cited by examiner

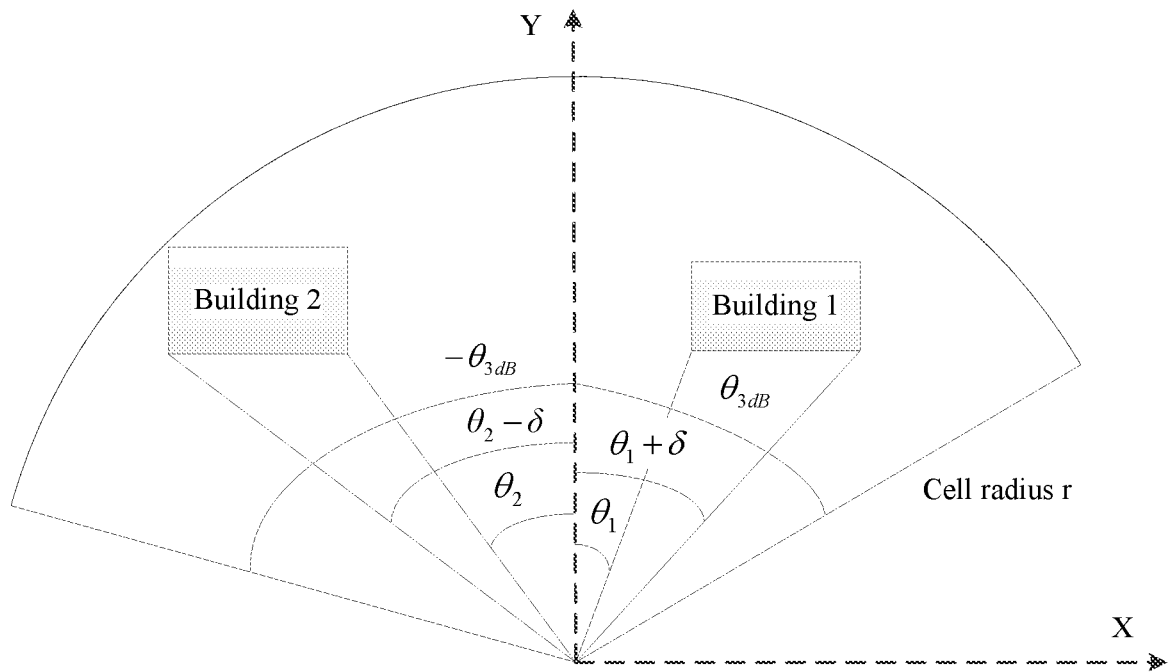
FIG. 2.a
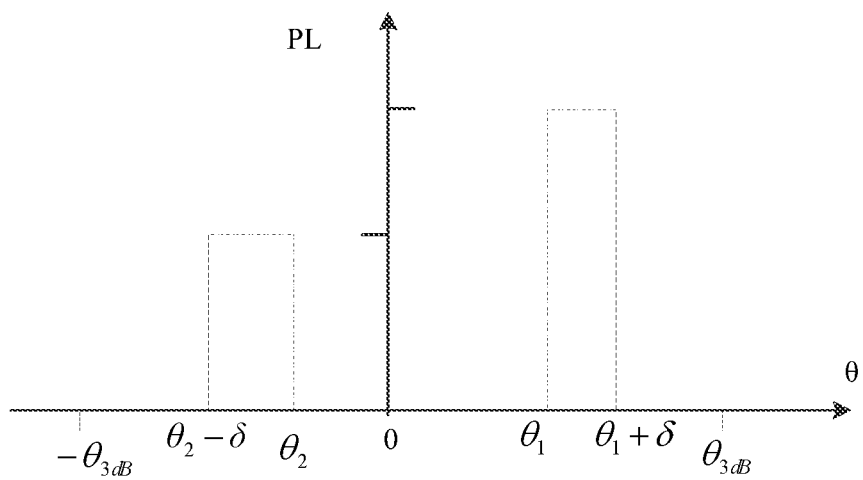
FIG. 2.b

FIG. 2.c

METHOD AND APPARATUS FOR DETERMINING BROADCAST BEAM WEIGHTED VALUE IN WIRELESS COMMUNICATIONS SYSTEM

CROSS-REFERENCE TO RELATED APPLICATIONS

This application is a continuation of International Application No. PCT/CN2017/084127, filed on May 12, 2017, the disclosure of which is hereby incorporated by reference in its entirety.

TECHNICAL FIELD

Embodiments of this application relate to the communications field, and in particular, to a method and an apparatus for determining a broadcast beam weighted value in a wireless communications system.

BACKGROUND

With development of a wireless communications technology, a communication requirement continuously increases, but wireless spectrum resources are limited. Therefore, beamforming of a large-scale multiple-input multiple-output technology needs to be used to adjust a transmit or receive antenna directivity pattern, and a channel spatial beam shape is further adjusted for different requirements, to increase a user capacity and meet the continuously increasing communication requirement.

In an antenna configuration of the large-scale multiple-input multiple-output technology, a fixed broadcast beam weighted value may be preset to weight a plurality of physical antennas in a wireless communications system, to form a fixed broadcast beam to serve a terminal in a cell.

However, different cells have different environments, or one cell has different environments at different time points. Therefore, if the broadcast beam is formed still by using the preset fixed broadcast beam weighted value, when a different cell environment is encountered, for example, an obstacle blocks signal transmission in a direction, a signal in the direction blocked by the obstacle is relatively weak, leading to weak signal coverage.

SUMMARY

Embodiments of this application provide a method and an apparatus for determining a broadcast beam weighted value in a wireless communications system, to determine the broadcast beam weighted value in the wireless communications system based on an obtained angle path loss spectrum.

A first aspect of this application provides a method for determining a broadcast beam weighted value in a wireless communications system. The method includes:

An angle path loss spectrum of a target cell at a current moment is obtained, where the angle path loss spectrum includes signal path loss values of a target base station in the target cell in a plurality of directions. In this embodiment of the present invention, the signal path loss values in the plurality of directions may be obtained through detection, calculation, or prediction, and is used as the angle path loss spectrum. A signal path loss value in this embodiment of the present invention is a signal path loss value related only to an angle centering on the target base station, and is unrelated to a distance from the target base station.

A beam angle power spectrum is determined based on the angle path loss spectrum, where the beam angle power spectrum includes signal transmit powers of the target base station in the plurality of directions, and in the beam angle power spectrum, a signal transmit power in a direction with a relatively large signal path loss value in the angle path loss spectrum is relatively large. In this embodiment of the present invention, when the angle path loss spectrum $P(\theta)$ is determined, to ensure cell coverage, a larger power is allocated to the direction with a relatively large path loss. Therefore, a beam angle power spectrum $P^*(\theta)$ of a target broadcast beam may be determined based on an angle path loss spectrum $P(\theta)$, so that a power obtained by the target broadcast beam in a direction with a relatively large path loss is relatively large. FIG. 2.c is a schematic diagram of a comparison between the angle path loss spectrum and the beam angle power spectrum.

Optionally, it is determined that the beam angle power spectrum $P^*(\theta)$ is equal to the angle path loss spectrum $P(\theta)$ plus a constant value p, where p is greater than 0. It should be noted that p is a transmit power in unblocked space.

In another feasible embodiment, for the beam angle power spectrum $P^*(\theta)$ and the angle path loss spectrum $P(\theta)$, it merely needs to ensure that a larger power is allocated to a location with a relatively large path loss. This is not limited herein.

A broadcast beam weighted value is determined based on the beam angle power spectrum.

In this embodiment of the present invention, the target broadcast beam is formed by weighting each column of antennas in the wireless communications system based on a specific weighted value. Therefore, the broadcast beam weighted value in the wireless communications system may be determined by using the beam angle power spectrum of the target broadcast beam, so that the wireless communications system forms the target broadcast beam based on the broadcast beam weighted value. In some feasible embodiments, a model for a mathematical optimization problem may be constructed, the obtained beam angle power spectrum is substituted into the model for the mathematical optimization problem, to obtain the required broadcast beam weighted value.

A target broadcast beam is formed based on the broadcast beam weighted value.

After the broadcast beam weighted value is determined, the broadcast beam weighted value may be used to form the target broadcast beam, so that a terminal in the target cell can obtain good signal coverage.

With reference to the first aspect of this application, in a first implementation of the first aspect of this application, the method includes:

A free space path loss function FreeSpacePL(d) is obtained, where a value of FreeSpacePL(d) is a signal path loss value of a signal transmitted by a signal transmission apparatus when a distance between a signal receiving apparatus and the signal transmission apparatus is d in an unblocked cell. Theoretically, it is considered that in the unblocked cell, for a same transceiving distance, losses on propagation paths are the same in different directions of the receiving apparatus, this is called a free space path loss value herein, and the free space path loss value is related to the distance d between the transmission apparatus and the receiving apparatus. In this way, the free space path loss function FreeSpacePL(d) may be obtained.

A location path loss value $PL(\theta,d)$ of the target cell at the current moment is obtained, where a value of $PL(\theta,d)$ is a signal path loss value of a signal transmitted by the target base station when a direction of a receiving apparatus relative to the target base station is θ and a distance between the receiving apparatus and the target base station is d, and θ is used to indicate the plurality of directions. In some feasible embodiments, the signal path loss value may be obtained by a base station, or the signal path loss value may be obtained by a third-party device and then sent to a base station, and this is not limited herein. Optionally, if the signal path loss value is obtained by the base station, the signal path loss value may be obtained by using a base station operation and maintenance subsystem. Specifically, environment information of the base station may be obtained by using a 3D digital map through laser scanning or in another manner, and then a location path loss value of each location in a sector covered by the base station is calculated by using another electromagnetic field prediction algorithm such as a ray tracing algorithm. This is not limited herein.

It is determined that the angle path loss spectrum P(θ) is equal to $\text{Max}_{0 \leq d \leq r}[\text{FreeSpacePL}(d) - \text{PL}(\theta,d)]$, where r is a maximum radius of the cell.

After the location path loss value PL(θ,d) and FreeSpacePL(d) are obtained, FreeSpacePL(d)−PL(θ,d) may be calculated, and a maximum value $\text{Max}_{0 \leq d \leq r}[\text{FreeSpacePL}(d) - \text{PL}(\theta,d)]$ of a difference between PL(θ,d) and FreeSpacePL(d) when d fall within a range [0,r] is used as the angle path loss spectrum P(θ). FreeSpacePL(d)−PL(θ,d) means a difference between a theoretical path loss value and an actual path loss value in free space when a distance between the terminal and the base station is d in the direction θ. The maximum value means a maximum value $\text{Max}_{0 \leq a \leq r}$ [FreeSpacePL(d)−PL(θ,d)] of a difference between path loss values in the direction in an actual environment, and is used as the angle path loss spectrum P(θ). The angle path loss spectrum P(θ) is related only to the angle θ, and is unrelated to the distance d.

With reference to the first aspect of this application, in a second implementation of the first aspect of this application, the method includes:

It is determined that the beam angle power spectrum P*(θ) is equal to the angle path loss spectrum P(θ) plus a constant value p, where p is greater than 0.

With reference to the first aspect of this application, in a third implementation of the first aspect of this application, the method includes:

A model for a target mathematical optimization problem is determined.

First, a function $f(W) = \int_a^b \|W^H F^H(\theta) F(\theta) W - P^*(\theta) - Pr\|_2^2 d\theta$ is set, where Pr is a weak coverage power threshold, W is a vector expression of the broadcast beam weighted value and may be represented as [w0, w1, w2, w3, ..., w(n−1)], F(θ) is an array directivity pattern of the wireless communications system, $W^H$ is a conjugate transpose of W, $F^H(\theta)$ is a conjugate transpose of F(θ) a and b are respectively coverage areas of the target broadcast beam in the cell, a≤b, $\|W^H F^H(\theta)F(\theta)W - P^*(\theta) - Pr\|_2^2$ is the square of a 2-norm of $W^H F^H(\theta)F(\theta)W - P^*(\theta) - Pr$, and f(W) is a calculus value of $W^H F^H(\theta)F(\theta)W - P^*(\theta) - Pr$. Then, it is determined that the model for the target mathematical optimization problem is $\min_{wf}(W)$, where $\min_{wf}(W)$ is a minimum value of f(W).

In some feasible embodiments, it needs to be ensured that a design of W=[w0, w1, w2, w3, ..., w(n−1)] meets the following constraints:

1. Horizontal beamwidth requirement: A beamwidth needs to meet a coverage requirement, and is usually not less than 65° in an urban area and not less than 90° in a suburban area.

2. Power efficiency: Based on a design of a beam weighted value, a ratio of a power radiated by a beam to a total power is greater than or equal to power radiation efficiency PE of a broadcast beam defined in a system specification requirement.

3. Sector power ratio SPR: In a preset range, a smaller SPR indicates a smaller sector overlapping area, and a smaller soft handover probability indicates a smaller call drop rate. This is a key indicator for network optimization, and the SPR usually needs to be less than 4%.

Therefore, the foregoing conditions may be quantized, and in this embodiment of the present invention, may be quantized as follows:

1. $2W^H F^H(\theta)F(\theta)W - W^H F^H(0)F(0)W \geq 0$, where $a \leq \theta \leq b$;

2. $\dfrac{W^H W}{N} \geq Pe$; and

3. $\int_a^\pi W^H F^H(\theta)F(\theta)Wd\theta + \int_{-\pi}^b W^H F^H(\theta)F(\theta)Wd\theta \leq SPR$.

To set W in f(W) to meet the foregoing three constraints, a penalty function method may be used for solving. A penalty function may be used to transform a constrained optimization problem into an unconstrained optimization problem. A penalty function $L(W) = f(W) + \int_a^b \eta(\theta)g(W,\theta)d\theta + \mu \cdot u(W) + \xi \cdot v(W)$ is constructed, where $g(W,\theta) = 2W^H F^H(\theta)F(\theta)W - W^H F^H(0)F(0)W$, $$u(W) = \dfrac{W^H W}{N} \geq Pe,$$

N is a quantity of dimensions of W, v(W) is $SPR - \int_a^\pi W^H F^H(\theta)F(\theta)Wd\theta - \int_{-\pi}^b W^H F^H(\theta)F(\theta)Wd\theta$, and η(θ), μ, and are respectively penalty factors of g(W,θ), u(W), and v(W). Then, it may be determined that the model for the target mathematical optimization problem is min wL(W), where min wL(W) is a minimum value of L(W).

P*(θ) is substituted into the model for the target mathematical optimization problem, to obtain the target mathematical optimization problem. After the model for the target mathematical optimization problem is determined, the beam angle power spectrum P*(θ) may be substituted into the model for the target mathematical optimization problem, to obtain the target mathematical optimization problem.

The target mathematical optimization problem is solved to obtain the broadcast beam weighted value. Optionally, the target mathematical optimization problem is solved by using a simplex search method, to obtain the broadcast beam weighted value. Because the simplex search method features strong universality during complex target function optimization, it can be ensured that the technical solution is still feasible and applicable when a constraint is added or the constraints are reduced. The simplex search method is a direct method of unconstrained optimization. The simplex search method is one of effective methods for solving a nonlinear multivariate function and an unconstrained minimization problem.

With reference to the first aspect of this application, in a fourth implementation of the first aspect of this application, the method includes:

A function $f(W) = \int_a^b \|W^H F^H(\theta)F(\theta)W - P^*(\theta) - Pr\|_2^2 d\theta$ is set, where Pr is a weak coverage power threshold, W is a vector expression of the broadcast beam weighted value, $F(\theta)$ is an array directivity pattern of the wireless communications system, $W^H$ is a conjugate transpose of $W$, $F^H(\theta)$ is a conjugate transpose of $F(\theta)$, a and b are respectively coverage areas of the target broadcast beam in the cell, $a \leq b$, $\|W^H F^H(\theta)F(\theta)W - P^*(\theta) - Pr\|_2^2$ is the square of a 2-norm of $W^H F^H(\theta)F(\theta)W - P^*(\theta) - Pr$, and f(W) is a calculus value of $W^H F^H(\theta)F(\theta)W - P^*(\theta) - Pr$.

It is determined that the model for the target mathematical optimization problem is min wf(W), where min wf(W) is a minimum value of f(W).

With reference to the first aspect of this application, in a fifth implementation of the first aspect of this application, the method includes:

W in f(W) is set to meet $2W^H F^H(\theta)F(\theta)W - W^H F^H(0)F(0)W \geq 0$, where $a \leq \theta \leq b$, $$\frac{W^H W}{N} \geq Pe,$$

$\int_a^\pi W^H F^H(\theta)F(\theta)W d\theta + \int_{-\pi}^b W^H F^H(\theta)F(\theta)W d\theta \leq SPR$, and N is a quantity of dimensions of W.

A penalty function $L(W) = f(W) + \int_a^b \eta(\theta)g(W,\theta)d\theta + \mu \cdot u(W) + \xi \cdot v(W)$ is constructed, where Pe is a power efficiency threshold, SPR is a sector power ratio threshold, $g(W,\theta) = 2W^H F^H(\theta)F(\theta)W - W^H F^H(0)F(0)W$, $$u(W) = \frac{W^H W}{N} \geq Pe,$$

v(W) is $SPR - \int_a^\pi W^H F^H(\theta)F(\theta)W d\theta - \int_{-\pi}^b W^H F^H(\theta)F(\theta)W d\theta$, and $\eta(\theta)$, $\mu$, and $\xi$ are respectively penalty factors of $g(W,\theta)$, u(W), and v(W).

It is determined that the model for the target mathematical optimization problem is min wL(W), where min wL(W) is a minimum value of L(W).

With reference to the first aspect of this application, in a sixth implementation of the first aspect of this application, the method includes:

W in f(W) is set to meet $2W^H F^H(\theta)F(\theta)W - W^H F^H(0)F(0)W \geq 0$, where $a \leq \theta \leq b$.

A penalty function $L(W) = f(W) + \int_a^b \eta(\theta)g(W,\theta)d\theta$ is constructed, where $g(W,\theta) = 2W^H F^H(\theta)F(\theta)W - W^H F^H(0)F(0)W$, and $\eta(\theta)$ is a penalty factor of $g(W,\theta)$.

It is determined that the model for the target mathematical optimization problem is min wL(W), where min wL(W) is a minimum value of L(W).

With reference to the first aspect of this application, in a seventh implementation of the first aspect of this application, the method includes:

The target mathematical optimization problem is solved by using a simplex search method, to obtain the broadcast beam weighted value.

A second aspect of this application provides an apparatus for determining a broadcast beam weighted value in a wireless communications system, including:

an obtaining module, configured to obtain an angle path loss spectrum of a target cell at a current moment, where the angle path loss spectrum includes signal path loss values of a target base station in the target cell in a plurality of directions;

a first determining module, configured to determine a beam angle power spectrum based on the angle path loss spectrum, where the beam angle power spectrum includes signal transmit powers of the target base station in the plurality of directions, and in the beam angle power spectrum, a signal transmit power in a direction with a relatively large signal path loss value in the angle path loss spectrum is relatively large;

a second determining module, configured to determine a broadcast beam weighted value based on the beam angle power spectrum; and an antenna system module, configured to form a target broadcast beam based on the broadcast beam weighted value.

With reference to the second aspect of this application, in a first implementation of the second aspect of this application, the apparatus includes:

a first obtaining submodule, configured to obtain a free space path loss function FreeSpacePL(d), where a value of FreeSpacePL(d) is a signal path loss value of a signal transmitted by a signal transmission apparatus when a distance between a signal receiving apparatus and the signal transmission apparatus is d in an unblocked cell;

a second obtaining submodule, configured to obtain a location path loss value $PL(\theta,d)$ of the target cell at the current moment, where a value of $PL(\theta,d)$ is a signal path loss value of a signal transmitted by the target base station when a direction of a receiving apparatus relative to the target base station is $\theta$ and a distance between the receiving apparatus and the target base station is d, and $\theta$ is used to indicate the plurality of directions; and a first determining submodule, configured to determine that the angle path loss spectrum $P(\theta)$ is equal to $\text{Max}_{0 \leq a \leq r}[\text{FreeSpacePL}(d) - PL(\theta,d)]$, where r is a maximum radius of the cell.

With reference to the second aspect of this application, in a second implementation of the second aspect of this application, the apparatus includes:

a determining submodule, configured to determine that the beam angle power spectrum $P^*(\theta)$ is equal to the angle path loss spectrum $P(\theta)$ plus a constant value p, where p is greater than 0.

With reference to the second aspect of this application, in a third implementation of the second aspect of this application, the apparatus includes:

a second determining submodule, configured to determine a model for a target mathematical optimization problem;

a calculation submodule, configured to substitute $P^*(\theta)$ into the model for the target mathematical optimization problem, to obtain the target mathematical optimization problem; and a solving submodule, configured to solve the target mathematical optimization problem to obtain the broadcast beam weighted value.

With reference to the second aspect of this application, in a fourth implementation of the second aspect of this application, the apparatus includes:

a function unit, configured to set a function $f(W) = \int_a^b \|W^H F^H(\theta)F(\theta)W - P^*(\theta) - Pr\|_2^2 d\theta$, where Pr is a weak coverage power threshold, W is a fall vector expression of the broadcast beam weighted value, $F(\theta)$ is an array directivity pattern of the wireless communications system, $W^H$ is a conjugate transpose of W, $F^H(\theta)$ is a conjugate transpose of $F(\theta)$, a and b are respectively coverage areas of the target broadcast beam in the cell, $a \leq b$, $\|W^H F^H(\theta)F(\theta)W - P^*(\theta) - Pr\|_2^2$ is the square of a 2-norm of $W^H F^H(\theta)F(\theta)W - P^*(\theta) - Pr$, and f(W) is a calculus value of $W^H F^H(\theta)F(\theta)W - P^*(\theta) - Pr$; and a first determining unit, configured to determine that the model for the target mathematical optimization problem is min wf(W), where min wf(W) is a minimum value of f(W).

With reference to the second aspect of this application, in a fifth implementation of the second aspect of this application, the apparatus includes:

a first condition unit, configured to set W in f(W) to meet $2W^HF^H(\theta)F(\theta)W-W^HF^H(0)F(0)W\geq 0$, where $a\leq\theta\leq b$, $$\frac{W^HW}{N} \geq Pe,$$

$\int_a^\pi W^HF^H(\theta)F(\theta)Wd\theta+\int_{-\pi}^b W^HF^H(\theta)F(\theta)Wd\theta \leq SPR$, and N is a quantity of dimensions of W;

a first function construction unit, configured to construct a penalty function $L(W)=f(W)+\int_a^b \eta(\theta)g(W,\theta)d\theta+\mu \cdot u(W)+\xi \cdot v(W)$, where Pe is a power efficiency threshold, SPR is a sector power ratio threshold, $g(W,\theta)=2W^HF^H(\theta)F(\theta)W-W^HF^H(0)F(0)W$, $$u(W) = \frac{W^HW}{N} \geq Pe,$$

v(W) is $SPR-\int_a^\pi W^HF^H(\theta)F(\theta)Wd\theta-\int_{-\pi}^b W^HF^H(\theta)F(\theta)Wd\theta$, and $\eta(\theta)$, $\mu$, and $\xi$ are respectively penalty factors of $g(W,\theta)$, u(W), and v(W); and a second determining unit, configured to determine that the model for the target mathematical optimization problem is min wL(W), where min wL(W) is a minimum value of L(W).

With reference to the second aspect of this application, in a sixth implementation of the second aspect of this application, the apparatus includes:

a second condition unit, configured to set W in f(W) to meet $2W^HF^H(\theta)F(\theta)W-W^HF^H(0)F(0)W\geq 0$, where $a\leq\theta\leq b$;

a second function construction unit, configured to construct a penalty function $L(W)=f(W)+\int_a^b \eta(\theta)g(W,\theta)d\theta$, where $g(W,\theta)=2W^HF^H(\theta)F(\theta)W-W^HF^H(0)F(0)W$, and $\eta(\theta)$ is a penalty factor of $g(W,\theta)$; and a third determining unit, configured to determine that the model for the target mathematical optimization problem is min wL(W), where min wL(W) is a minimum value of L(W).

With reference to the second aspect of this application, in a seventh implementation of the second aspect of this application, the apparatus includes:

a solving unit, configured to solve the target mathematical optimization problem by using a simplex search method, to obtain the broadcast beam weighted value.

A third aspect of this application provides an apparatus for determining a broadcast beam weighted value in a wireless communications system, including:

a bus, a processor, a memory, a transceiver, and an antenna system, where the bus is configured to be connected to the processor, the memory, the transceiver, and the antenna system;

the transceiver is configured to obtain an angle path loss spectrum of a target cell at a current moment, where the angle path loss spectrum includes signal path loss values of a target base station in the target cell in a plurality of directions;

the processor is configured to: determine a beam angle power spectrum based on the angle path loss spectrum, where the beam angle power spectrum includes signal transmit powers of the target base station in the plurality of directions, and in the beam angle power spectrum, a signal transmit power in a direction with a relatively large signal path loss value in the angle path loss spectrum is relatively large; and determine a broadcast beam weighted value based on the beam angle power spectrum;

the antenna system is configured to form a target broadcast beam based on the broadcast beam weighted value; and the memory is configured to store a program, the angle path loss spectrum, and the beam angle power spectrum.

Another aspect of this application provides a computer readable storage medium. The computer readable storage medium stores an instruction, and when the instruction is run on a computer, the computer is enabled to perform the method in the foregoing aspects.

As can be learned from the foregoing technical solutions, the embodiments of this application have the following advantages:

The angle path loss spectrum of the target cell at the current moment is obtained, and the corresponding beam angle power spectrum is determined based on the angle path loss spectrum. In the beam angle power spectrum, the transmit power in the direction with a relatively large signal path loss value in the angle path loss spectrum is relatively large. Therefore, when the target broadcast beam is formed by using the beam angle power spectrum, a larger transmit power may be allocated to a direction with relatively poor signal coverage, to reduce a problem of weak signal coverage.

BRIEF DESCRIPTION OF DRAWINGS

FIG. 2.a is a schematic diagram of a coverage environment of a base station according to an embodiment of this application;

FIG. 2.b is a schematic diagram of a relative extra loss according to an embodiment of this application;

FIG. 2.c is a schematic diagram of a comparison between an angle path loss spectrum and a beam angle power spectrum according to an embodiment of this application;

DESCRIPTION OF EMBODIMENTS

Embodiments of this application provide a method and an apparatus for determining a broadcast beam weighted value in a wireless communications system, to determine the broadcast beam weighted value in the wireless communications system based on an obtained angle path loss spectrum.

To make persons of ordinary skill in the art better understand the solutions in the embodiments of the present invention, the following clearly describes the technical solutions in the embodiments of the present invention with reference to the accompanying drawings in the embodiments of the present invention. Apparently, the described embodiments are merely some but not all of the embodiments of the present invention.

In the specification, claims, and accompanying drawings of the present invention, the terms "first", "second", "third", "fourth", and on the like (if existent) are intended to distinguish between similar objects but are not necessarily intended to indicate a specific order or sequence. It should be understood that the terms used in such a way are interchangeable in proper circumstances, so that the embodiments described herein can be implemented in other orders than the order illustrated or described herein. Moreover, the terms "include", "contain", and any other variants thereof mean to cover the non-exclusive inclusion, for example, a process, method, system, product, or device that includes a list of steps or units is not necessarily limited to those expressly listed steps or units, but may include other steps or units not expressly listed or inherent to such a process, method, product, or device.

Figure 1:
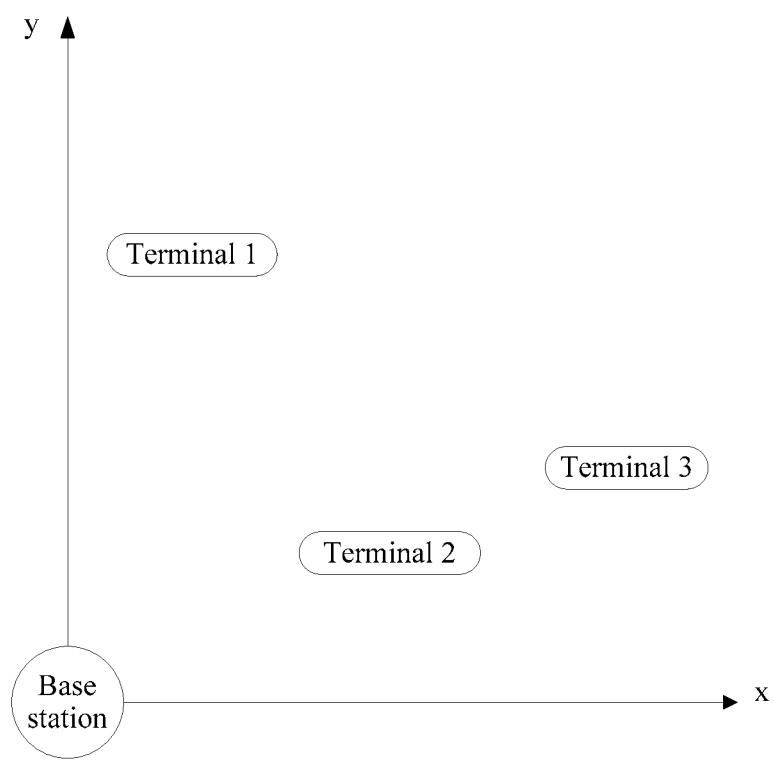
FIG. 1 is a schematic architectural diagram of a wireless communications system according to an embodiment of this application.

FIG. 1 shows an architecture of a wireless communications system according to an embodiment of this application. The wireless communications system includes a base station and terminals.

In this embodiment of this application, the base station, namely, a public mobile communications base station, is a form of a radio station, and is a radio transceiver station that transfers information to a mobile phone terminal in a specific radio coverage area by using a mobile communication switching center.

In this embodiment of this application, the terminal may be any terminal device such as a mobile phone, a tablet computer, a PDA (Personal Digital Assistant), a POS (Point of Sales), a vehicle-mounted computer, or the like. A structure of the terminal is described by using the mobile phone as an example, and includes components such as a radio frequency (RF) circuit, a memory, an input unit, a display unit, a sensor, an audio circuit, a wireless fidelity (Wi-Fi) module, a processor, and a power supply. Persons skilled in the art may understand that the structure of the mobile phone imposes no limitation on the mobile phone, and the mobile phone may include more or fewer components than those shown in the figure, or combine some components, or have different component arrangements.

In this embodiment of this application, one base station may serve one or more cells. The cell is also referred to as a cellular cell, and is an area covered by a same base station in a cellular mobile communications system. The terminal may communicate with the base station in the area by using a radio channel. In some feasible embodiments, the cell may alternatively be a sector. This is not limited herein.

In this embodiment of this application, the base station may have a built-in wireless communications system, to form a target broadcast beam. The wireless communications system includes a transmit antenna and a receive antenna, the wireless communications system includes a plurality of columns of antennas, and the plurality of columns of antennas respectively modulate different powers to enable the wireless communications system to form different beams. When a specific target broadcast beam needs to be formed, first, a broadcast beam weighted value required by each column of antennas may be obtained through calculation based on the target broadcast beam, and then the wireless communications system forms the target broadcast beam based on the broadcast beam weighted value.

In this embodiment of this application, a broadcast beam is a shape formed on a ground by an electromagnetic wave transmitted by the wireless communications system. The base station forms a beam by using the built-in wireless communications system, and the terminal needs to be in the beam to communicate with the base station.

With development of a wireless communications technology, a communication requirement continuously increases, but wireless spectrum resources are limited. Therefore, beamforming of a large-scale multiple-input multiple-output technology needs to be used to adjust a transmit or receive antenna directivity pattern. In an antenna configuration of the large-scale multiple-input multiple-output technology, a fixed broadcast beam weighted value may be preset to weight a plurality of physical antennas in the wireless communications system, to form a fixed broadcast beam to serve a terminal in a cell. However, different cells have different environments, or one cell has different environments at different time points. Therefore, if the broadcast beam is formed still by using the preset fixed broadcast beam weighted value, when a different cell environment is encountered, for example, an obstacle blocks signal transmission in a direction, a signal in the direction blocked by the obstacle is relatively weak, leading to weak signal coverage.

Therefore, in this application, an angle path loss spectrum of a target cell at a current moment is obtained, and a corresponding beam angle power spectrum is determined based on the angle path loss spectrum. In the beam angle power spectrum, a transmit power in a direction with a relatively large signal path loss value in the angle path loss spectrum is relatively large. Therefore, when a target broadcast beam is formed by using the beam angle power spectrum, a larger transmit power may be allocated to a direction with relatively poor signal coverage, to reduce the problem of the weak signal coverage.

Figure 2:
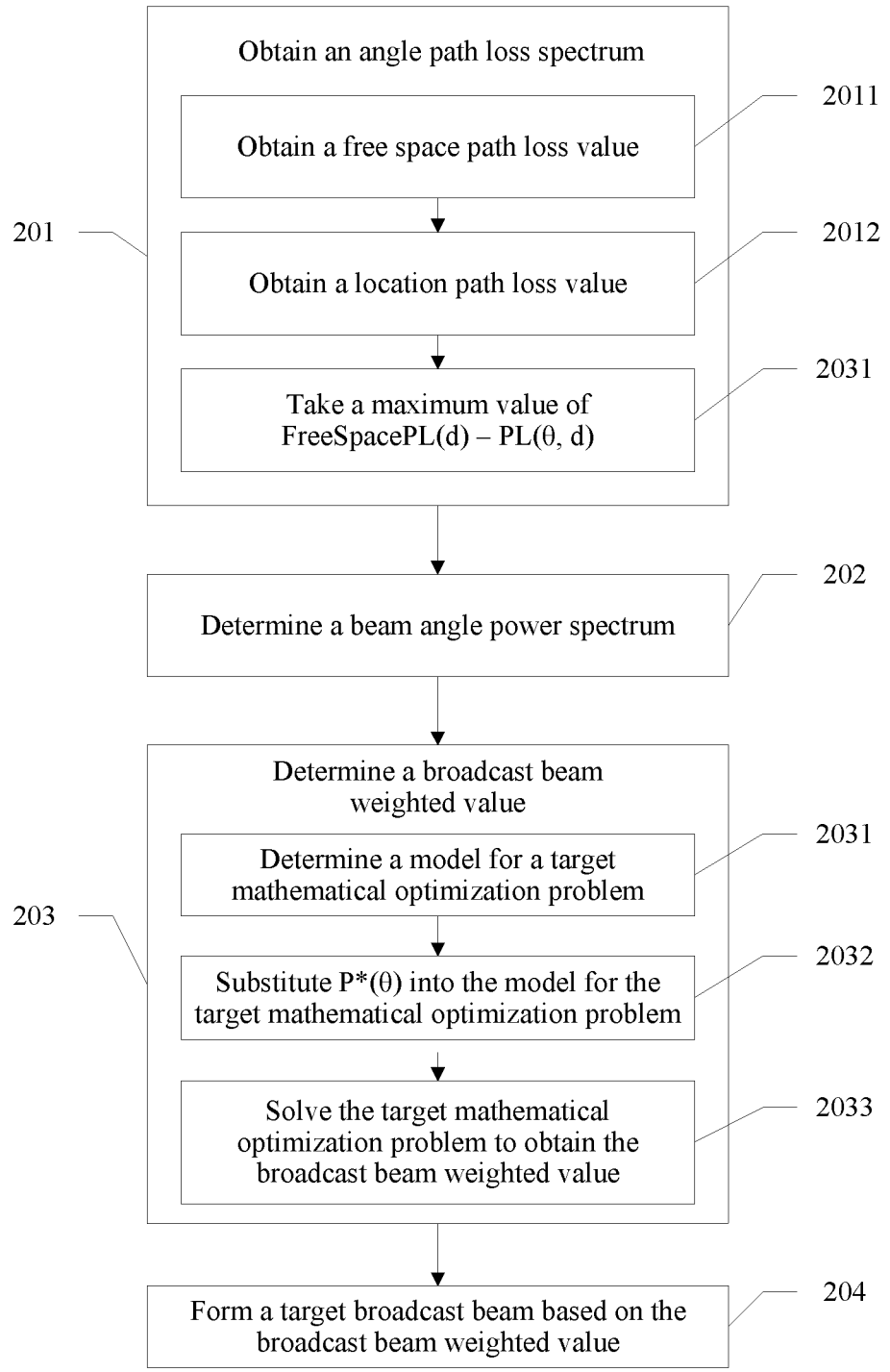
FIG. 2 is a schematic diagram of an embodiment of a method for determining a broadcast beam weighted value in a wireless communications system according to an embodiment of this application.

In view of this, FIG. 2 shows a method for determining a broadcast beam weighted value in an antenna communications system. The method includes the following steps.

201. Obtain an angle path loss spectrum of a target cell at a current moment, where the angle path loss spectrum includes signal path loss values of a target base station in the target cell in a plurality of directions.

In this embodiment of this application, a signal path loss value is an amount of loss generated when an electromagnetic wave sent by a wireless communications system is propagated in space. The loss is caused by radiation and spreading of a transmit power of a signal and a propagation feature of a channel. A change of an average value of a received signal power in a macroscopic range is reflected. It should be noted that in practice, due to quite different locations in an environment, such as obstruction of a building in a city or obstruction of trees in a forest, receive powers at different receiving points with a same transceiving distance are greatly different, and even a receive power at a same receiving point also greatly fluctuates at different time points.

In this embodiment of the present invention, the signal path loss values in the plurality of directions may be obtained through detection, calculation, or prediction, and is used as the angle path loss spectrum. The signal path loss value in this embodiment of the present invention is a signal path loss value related only to an angle centering on the target base station, and is unrelated to a distance from the target base station. In other words, signal path loss values in a same direction in the angle path loss spectrum are the same.

A scenario is used as an example for description below. FIG. 2.a is a schematic diagram of a coverage environment of a base station. A radius of a cell covered by the base station is set to r. A cell coverage area is defined as follows: A sector that centers on the base station, whose radius is r, and that is from an angle a to an angle b is used as the coverage area. In the coverage area, it is assumed that there are two buildings: a building 1 and a building 2, and the building 1 and the building 2 are respectively located at azimuths $\delta 1$ and $\delta 2$. Due to obstruction of the building 1 and the building 2, there are locations blocked by the buildings within the radius of the cell at the azimuths $\delta 1$ and $\delta 2$, and a relative extra loss of a signal is caused. FIG. 2.b is a schematic diagram of a relative extra loss. In this case, if the broadcast beam weighted value in the wireless communications system is still designed in a fixed manner, a broadcast channel signal received by a user at the locations blocked at the azimuths $\delta 1$ and $\delta 2$ increasingly attenuates, and even becomes weaker than a background noise. As a result, the broadcast channel signal cannot be correctly demodulated, and a weak coverage probability in the cell increases.

Specifically, the angle path loss spectrum may be obtained by using the following step 2011 to step 2013.

2011. Obtain a free space path loss function FreeSpacePL(d), where a value of FreeSpacePL(d) is a signal path loss value of a signal transmitted by a signal transmission apparatus when a distance between a signal receiving apparatus and the signal transmission apparatus is d in an unblocked cell.

Theoretically, it is considered that in the unblocked cell, for a same transceiving distance, losses on propagation paths are the same in different directions of the receiving apparatus, this is called a free space path loss value herein, and the free space path loss value is related to the distance d between the transmission apparatus and the receiving apparatus. In this way, the free space path loss function FreeSpacePL(d) may be obtained.

2012. Obtain a location path loss value PL(θ,d) of the target cell at the current moment, where a value of PL(θ,d) is a signal path loss value of a signal transmitted by the target base station when a direction of a receiving apparatus relative to the target base station is θ and a distance between the receiving apparatus and the target base station is d, and θ is used to indicate the plurality of directions.

In some feasible embodiments, a location path loss value PL(θ,d) of each location may be obtained through detection or in another manner. It should be noted that PL(θ,d) herein is related to both the angle θ and the distance d, and refers to a path loss value of a communication signal sent by a built-in wireless communications system of the base station and received by a terminal when a distance between the terminal and the base station is d and a direction of the terminal relative to the base station is θ.

In some feasible embodiments, the signal path loss value may be obtained by the base station, or the signal path loss value may be obtained by a third-party device and then sent to the base station. This is not limited herein. Optionally, if the signal path loss value is obtained by the base station, the signal path loss value may be obtained by using a base station operation and maintenance subsystem. Specifically, environment information of the base station may be obtained by using a 3D digital map through laser scanning or in another manner, and then a location path loss value of each location in a sector covered by the base station is calculated by using another electromagnetic field prediction algorithm such as a ray tracing algorithm. This is not limited herein.

2013. Determine that the angle path loss spectrum P(θ) is equal to $Max_{0 \leq d \leq r}[FreeSpacePL(d)-PL(\theta,d)]$, where r is a maximum radius of the cell.

After the location path loss value PL(θ,d) and FreeSpacePL(d) are obtained, FreeSpacePL(d)−PL(θ,d) may be calculated, and a maximum value $Max_{0 \leq d \leq r}[FreeSpacePL(d)-PL(\theta,d)]$ of a difference between PL(θ,d) and FreeSpacePL(d) when d fall within a range [0, r] is used as the angle path loss spectrum P(θ). FreeSpacePL(d)−PL(θ,d) means a difference between a theoretical path loss value and an actual path loss value in free space when the distance between the terminal and the base station is d in the direction θ. The maximum value means a maximum value $Max_{0 \leq a \leq r}$ [FreeSpacePL(d)−PL(θ,d)] of a difference between path loss values in the direction in an actual environment, and is used as the angle path loss spectrum P(θ). The angle path loss spectrum P(θ) is related only to the angle θ, and is unrelated to the distance d.

202. Determine a beam angle power spectrum based on the angle path loss spectrum, where the beam angle power spectrum includes signal transmit powers of the target base station in the plurality of directions, and in the beam angle power spectrum, a signal transmit power in a direction with a relatively large signal path loss value in the angle path loss spectrum is relatively large.

In this embodiment of the present invention, when the angle path loss spectrum P(θ) is determined, to ensure cell coverage, a larger power is allocated to the direction with a relatively large path loss. Therefore, a beam angle power spectrum P*(θ) of a target broadcast beam may be determined based on an angle path loss spectrum P(θ), so that a power obtained by the target broadcast beam in a direction with a relatively large path loss is relatively large. FIG. 2.c is a schematic diagram of a comparison between the angle path loss spectrum and the beam angle power spectrum.

Optionally, it is determined that the beam angle power spectrum P*(θ) is equal to the angle path loss spectrum P(θ) plus a constant value p, where p is greater than 0. It should be noted that p is a transmit power in unblocked space.

In another feasible embodiment, for the beam angle power spectrum P*(θ) and the angle path loss spectrum P(θ), it merely needs to ensure that a larger power is allocated to a location with a relatively large path loss. This is not limited herein.

203. Determine a broadcast beam weighted value based on the beam angle power spectrum.

In this embodiment of the present invention, the target broadcast beam is formed by weighting each column of antennas in the wireless communications system based on a specific weighted value. Therefore, the broadcast beam weighted value in the wireless communications system may be determined by using the beam angle power spectrum of the target broadcast beam, so that the wireless communications system forms the target broadcast beam based on the broadcast beam weighted value. In some feasible embodiments, a model for a mathematical optimization problem may be constructed, the obtained beam angle power spectrum is substituted into the model for the mathematical optimization problem, to obtain the required broadcast beam weighted value.

Specifically, calculation is performed by using a method of the following step 2031 to step 2033, including:

2031. Determine a model for a target mathematical optimization problem.

First, a function $f(W)=\int_a^b \|W^H F^H(\theta)F(\theta)W - P^*(\theta) - Pr\|_2^2 \, d\theta$ is set, where Pr is a weak coverage power threshold, W is a vector expression of the broadcast beam weighted value and may be represented as $[w0, w1, w2, w3, \ldots, w(n-1)]$, $F(\theta)$ is an array directivity pattern of the wireless communications system, $W^H$ is a conjugate transpose of W, $F^H(\theta)$ is a conjugate transpose of $F(\theta)$ a and b are respectively coverage areas of the target broadcast beam in the cell, a≤b, $\|W^H F^H(\theta)F(\theta)W - P^*(\theta) - Pr\|_2^2$ is the square of a 2-norm of $W^H F^H(\theta)F(\theta)W - P^*(\theta) - Pr$, and f(W) is a calculus value of $W^H F^H(\theta)F(\theta)W - P^*(\theta) - Pr$. Then, it is determined that the model for the target mathematical optimization problem is min wf(W), where min wf(W) is a minimum value of f(W).

It should be noted that weak coverage means a relatively weak signal in a boundary area due to a large area that needs to be covered by the base station, an excessively large distance between base stations, or obstruction of a building. Weak coverage usually means that a received signal level is less than −90 dBm. Weak coverage directly affects call quality and requires special attention. In view of this, the weak coverage power threshold needs to be added to the function f(W). In this embodiment of the present invention, W is an independent variable, and is a weighted value that is of each column of antennas in the wireless communications system and that needs to be solved. Optionally, in the function f(W), a may be $-\theta_{3db}$, and then b may be $\theta_{3db}$; or a may be $-\theta_{10db}$, and then b is $\theta_{10db}$, where $\theta_{3db}$ and $-\theta_{3db}$ are angles corresponding to a horizontal 3 dB beamwidth of a single column of antennas, and $\theta_{10db}$ and $-\theta_{10db}$ are angles corresponding to a horizontal 10 dB beamwidth of the single column of antennas.

In some feasible embodiments, it needs to be ensured that a design of $W=[w0, w1, w2, w3, \ldots, w(n-1)]$ meets the following constraints:

1. Horizontal beamwidth requirement: A beamwidth needs to meet a coverage requirement, and is usually not less than 65° in an urban area and not less than 90° in a suburban area.

2. Power efficiency: Based on a design of a beam weighted value, a ratio of a power radiated by a beam to a total power is greater than or equal to power radiation efficiency PE of a broadcast beam defined in a system specification requirement.

3. Sector power ratio SPR: In a preset range, a smaller SPR indicates a smaller sector overlapping area, and a smaller soft handover probability indicates a smaller call drop rate. This is a key indicator for network optimization, and the SPR usually needs to be less than 4%.

Therefore, the foregoing conditions may be quantized, and in this embodiment of the present invention, may be quantized as follows:

1. $2W^H F^H(\theta)F(\theta)W - W^H F^H(0)F(0)W \geq 0$, where $a \leq \theta \leq b$;

2. $\dfrac{W^H W}{N} \geq Pe$; and

3. $\int_a^\pi W^H F^H(\theta)F(\theta)W d\theta + \int_{-\pi}^b W^H F^H(\theta)F(\theta)W d\theta \leq SPR$.

To set W in f(W) to meet the foregoing three constraints, a penalty function method may be used for solving. A penalty function may be used to transform a constrained optimization problem into an unconstrained optimization problem. A penalty function $L(W)=f(W)+\int_a^b \eta(\theta)g(W,\theta)d\theta + \mu \cdot u(W) + \xi \cdot v(W)$ is constructed, where $g(W,\theta)=2W^H F^H(\theta)F(\theta)W - W^H F^H(0)F(0)W$, $$u(W) = \dfrac{W^H W}{N} \geq Pe,$$

N is a quantity of dimensions of W, v(W) is $SPR-\int_a^\pi W^H F^H(\theta)F(\theta)W d\theta - \int_{-\pi}^b W^H F^H(\theta)F(\theta)W d\theta$, and $\eta(\theta)$, $\mu$, and are respectively penalty factors of $g(W, \theta)$, u(W), and v(W).

It is determined that the model for the target mathematical optimization problem is min wL(W), where min wL(W) is a minimum value of L(W).

Therefore, in some other feasible embodiments, the foregoing three constraints do not need to be strictly met, that is, a constraint may be added or the constraints may be reduced based on an actual situation. For example, in some cases, a constraint 2 cannot be compulsorily met due to a limitation of a system condition, or a constraint 3 does not need to be compulsorily met due to a geographical location distribution of a cell. The following describes an implementation of the technical solution when the two constraints are removed due to an actual situation:

W in f(W) is set to meet $2W^H F^H(\theta)F(\theta)W - W^H F^H(0)F(0)W \geq 0$, where a≤θ≤b.

A penalty function $L(W)=f(W)+\int_a^b \eta(\theta)g(W,\theta)d\theta$ is constructed, where $g(W,\theta)=2W^H F^H(\theta)F(\theta)W - W^H F^H(0)F(0)W$, and $\eta(\theta)$ is a penalty factor of $g(W,\theta)$.

It is determined that the model for the target mathematical optimization problem is min wL(W), where min wL(W) is a minimum value of L(W).

2032. Substitute a value of $P^*(\theta)$ into the model for the target mathematical optimization problem, to obtain the target mathematical optimization problem.

After the model for the target mathematical optimization problem is determined, the beam angle power spectrum $P^*(\theta)$ may be substituted into the model for the target mathematical optimization problem, to obtain the target mathematical optimization problem.

2033. Solve the target mathematical optimization problem to obtain the broadcast beam weighted value.

Optionally, the target mathematical optimization problem is solved by using a simplex search method, to obtain the broadcast beam weighted value. Because the simplex search method features strong universality during complex target function optimization, it can be ensured that the technical solution is still feasible and applicable when a constraint is added or the constraints are reduced. The simplex search method is a direct method of unconstrained optimization. The simplex search method is one of effective methods for solving a nonlinear multivariate function and an unconstrained minimization problem.

204. Form a target broadcast beam based on the broadcast beam weighted value.

After the broadcast beam weighted value is determined, the broadcast beam weighted value may be used to form the target broadcast beam, so that a terminal in the target cell can obtain good signal coverage.

Figure 3:
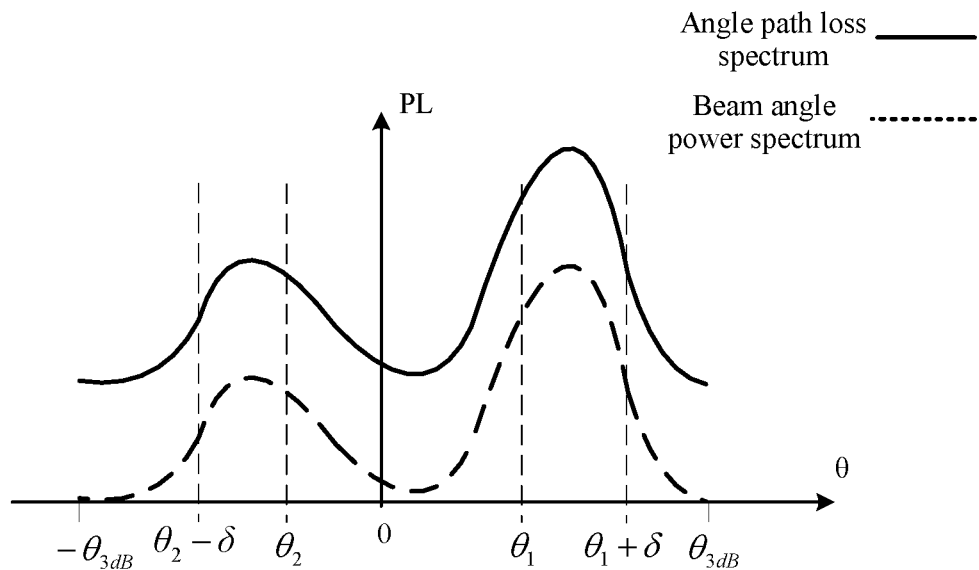
FIG. 3 is a schematic diagram of an embodiment of an apparatus for determining a broadcast beam weighted value in a wireless communications system according to an embodiment of this application.
Figure 3:
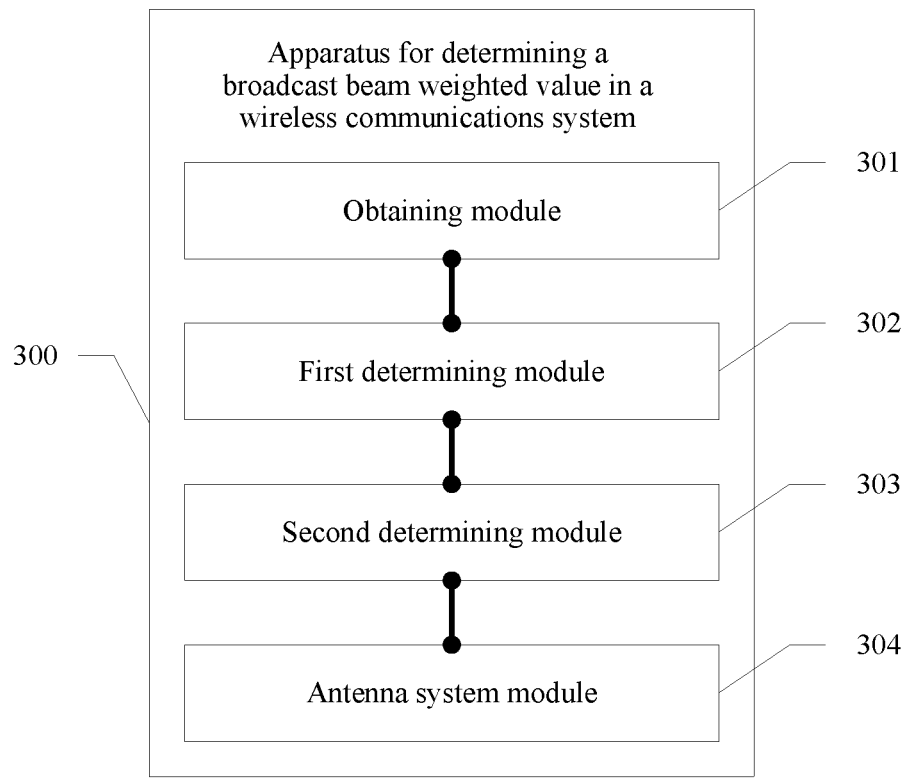

Referring to FIG. 3, an embodiment of this application further provides an apparatus 300 for determining a broadcast beam weighted value in a wireless communications system, including:

an obtaining module 301, configured to obtain an angle path loss spectrum of a target cell at a current moment, where the angle path loss spectrum includes signal path loss values of a target base station in the target cell in a plurality of directions;

a first determining module 302, configured to determine a beam angle power spectrum based on the angle path loss spectrum, where the beam angle power spectrum includes signal transmit powers of the target base station in the plurality of directions, and in the beam angle power spectrum, a signal transmit power in a direction with a relatively large signal path loss value in the angle path loss spectrum is relatively large;

a second determining module 303, configured to determine a broadcast beam weighted value based on the beam angle power spectrum; and an antenna system module 304, configured to form a target broadcast beam based on the broadcast beam weighted value.

Figure 4:
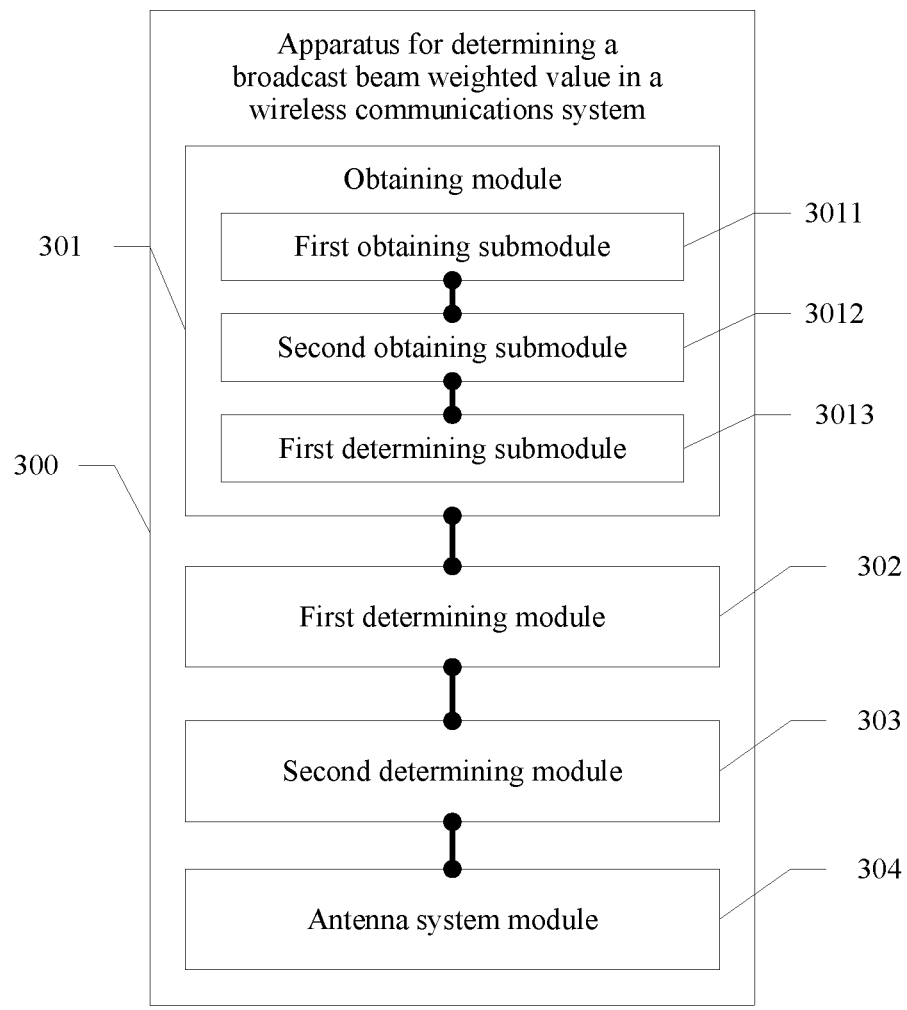
FIG. 4 is a schematic diagram of another embodiment of an apparatus for determining a broadcast beam weighted value in a wireless communications system according to an embodiment of this application.

Referring to FIG. 4, the obtaining module 301 includes:

a first obtaining submodule 3011, configured to obtain a free space path loss function FreeSpacePL(d), where a value of FreeSpacePL(d) is a signal path loss value of a signal transmitted by a signal transmission apparatus when a distance between a signal receiving apparatus and the signal transmission apparatus is d in an unblocked cell;

a second obtaining submodule 3012, configured to obtain a location path loss value $PL(\theta,d)$ of the target cell at the current moment, where a value of $PL(\theta,d)$ is a signal path loss value of a signal transmitted by the target base station when a direction of a receiving apparatus relative to the target base station is $\theta$ and a distance between the receiving apparatus and the target base station is d, and $\theta$ is used to indicate the plurality of directions; and a first determining submodule 3013, configured to determine that the angle path loss spectrum $P(\theta)$ is equal to $Max_{0 \leq s \leq r}[FreeSpacePL(d)-PL(\theta,d)]$, where r is a maximum radius of the cell.

Figure 5:
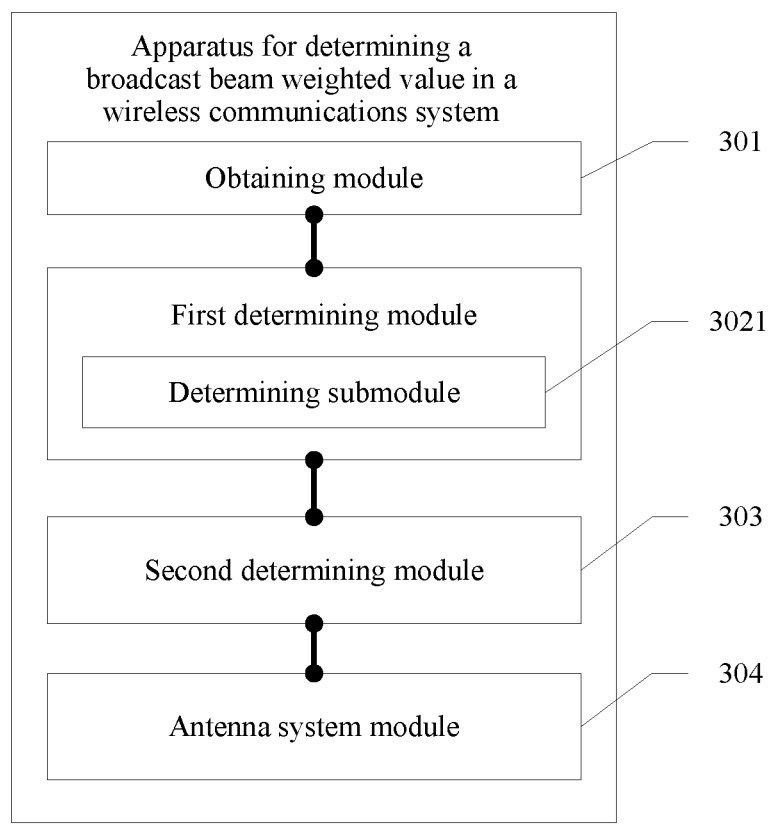
FIG. 5 is a schematic diagram of another embodiment of an apparatus for determining a broadcast beam weighted value in a wireless communications system according to an embodiment of this application.

Referring to FIG. 5, the first determining module 302 includes:

a determining submodule 3021, configured to determine that the beam angle power spectrum $P^*(\theta)$ is equal to the angle path loss spectrum $P(\theta)$ plus a constant value p, where p is greater than 0.

Figure 6:
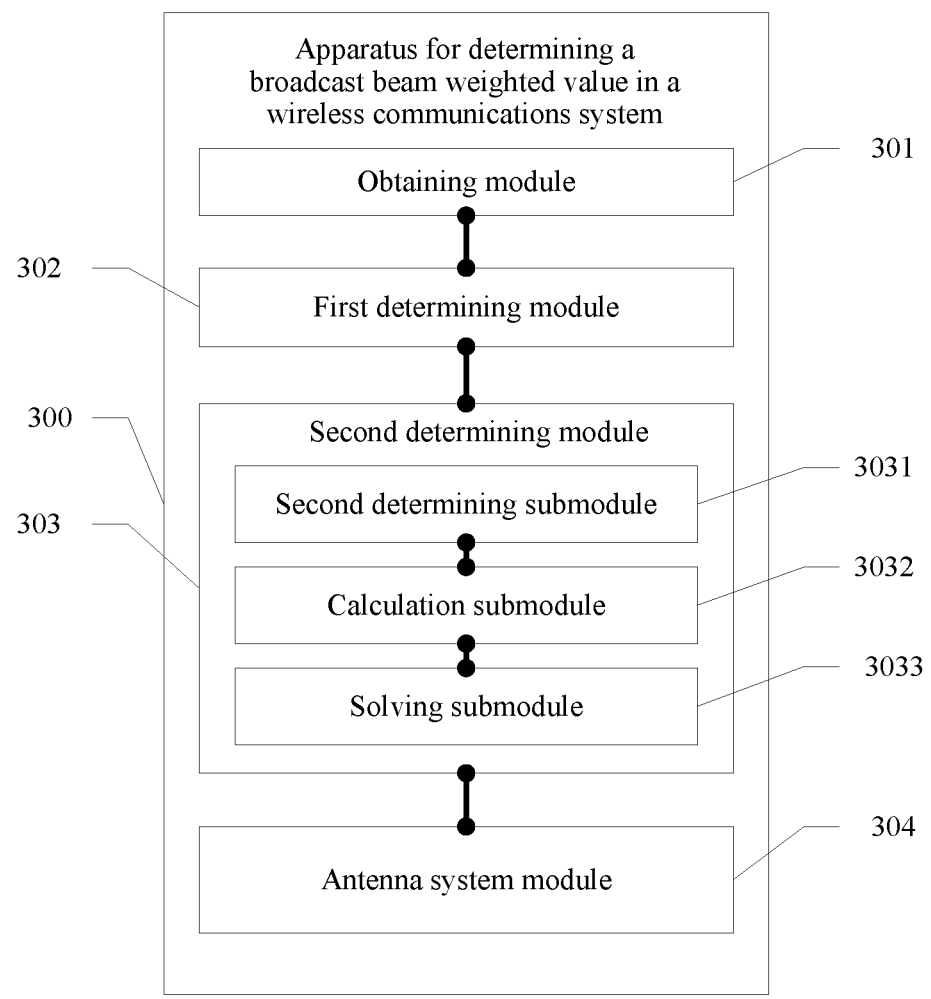
FIG. 6 is a schematic diagram of another embodiment of an apparatus for determining a broadcast beam weighted value in a wireless communications system according to an embodiment of this application.

Referring to FIG. 6, the second determining module 303 includes:

a second determining submodule 3031, configured to determine a model for a target mathematical optimization problem;

a calculation submodule 3032, configured to substitute $P^*(\theta)$ into the model for the target mathematical optimization problem, to obtain the target mathematical optimization problem; and a solving submodule 3033, configured to solve the target mathematical optimization problem to obtain the broadcast beam weighted value.

Figure 7:
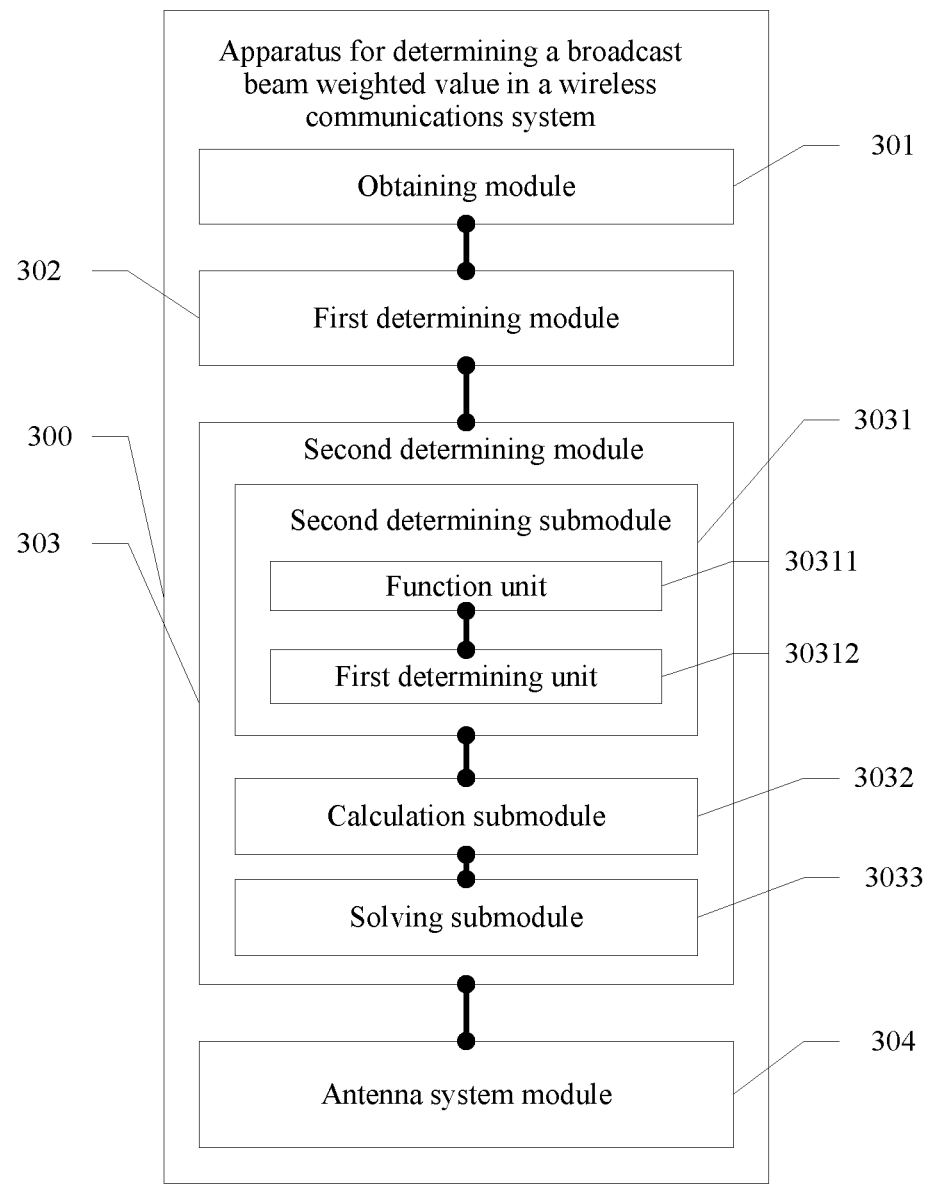
FIG. 7 is a schematic diagram of another embodiment of an apparatus for determining a broadcast beam weighted value in a wireless communications system according to an embodiment of this application.

Referring to FIG. 7, the second determining submodule 3031 includes:

a function unit 30311, configured to set a function $f(W)=\int_a^b \|W^H F^H(\theta)F(\theta)W-P^*(\theta)-Pr\|_2^2 d\theta$, where Pr is a weak coverage power threshold, W is a fall vector expression of the broadcast beam weighted value, $F(\theta)$ is an array directivity pattern of the wireless communications system, $W^H$ is a conjugate transpose of W, $F^H(\theta)$ is a conjugate transpose of $F(\theta)$, a and b are respectively coverage areas of the target broadcast beam in the cell, $a \leq b$, $\|W^H F^H(\theta)F(\theta)W-P^*(\theta)-Pr\|_2^2$ is the square of a 2-norm of $W^H F^H(\theta)F(\theta)W-P^*(\theta)-Pr$, and f(W) is a calculus value of $W^H F^H(\theta)F(\theta)W-P^*(\theta)-Pr$; and a first determining unit 30312, configured to determine that the model for the target mathematical optimization problem is min wf(W), where min wf(W) is a minimum value of f(W).

Figure 8:
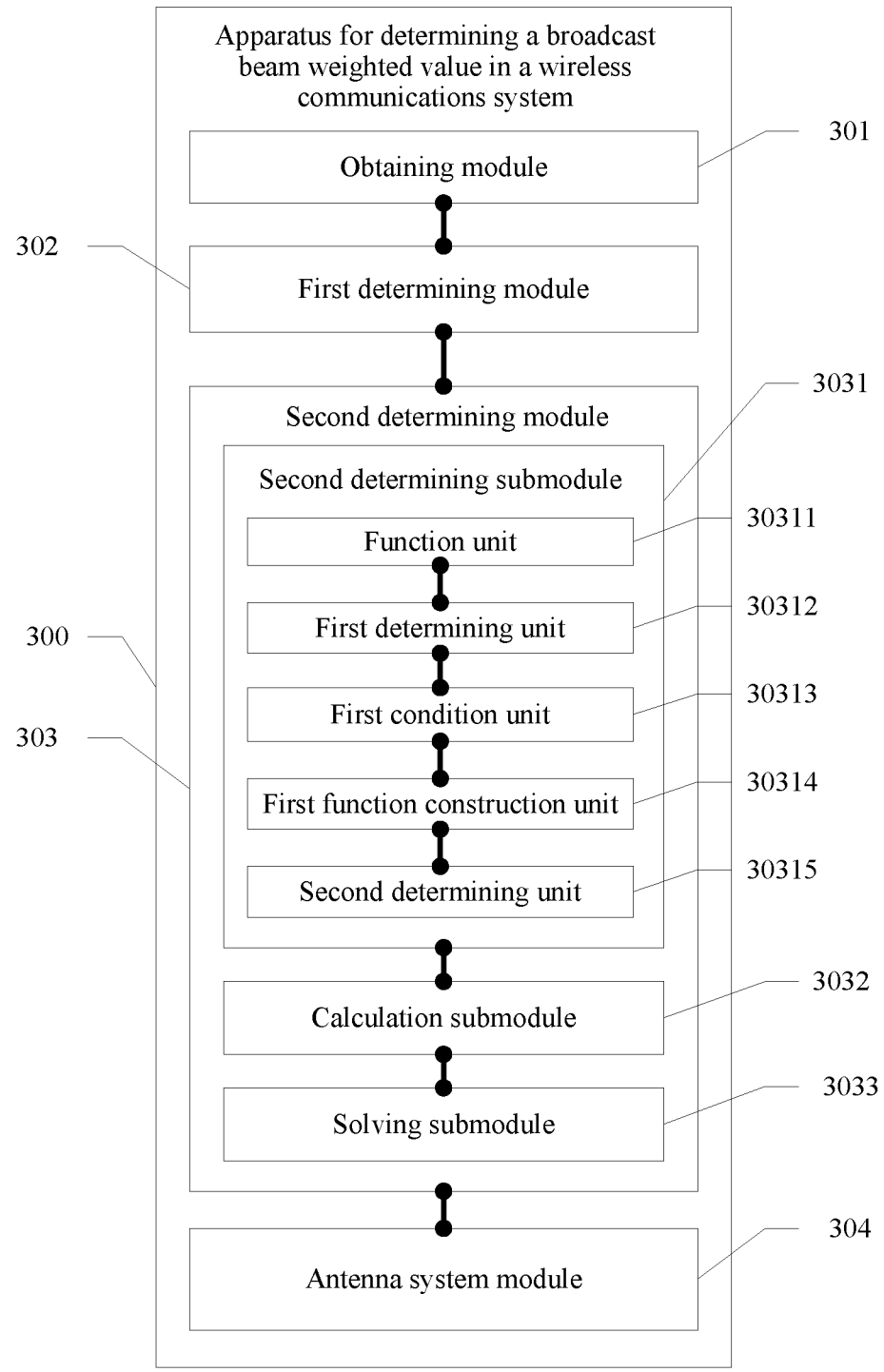
FIG. 8 is a schematic diagram of another embodiment of an apparatus for determining a broadcast beam weighted value in a wireless communications system according to an embodiment of this application.

Referring to FIG. 8, the second determining submodule 3031 further includes:

a first condition unit 30313, configured to set W in f(W) to meet $2W^H F^H(\theta)F(\theta)W-W^H F^H(0)F(0)W \geq 0$, where $a \leq \theta \leq b$, $$\frac{W^H W}{N} \geq Pe,$$

$\int_a^\pi W^H F^H(\theta)F(\theta)Wd\theta + \int_{-\pi}^b W^H F^H(\theta)F(\theta)Wd\theta \leq SPR$, and N is a quantity of dimensions of W;

a first function construction unit 30314, configured to construct a penalty function $L(W)=f(W)+\int_a^b \eta(\theta)g(W,\theta)d\theta + \mu \cdot u(W)+\xi \cdot v(W)$, where Pe is a power efficiency threshold, SPR is a sector power ratio threshold, $g(W,\theta)=2W^H F^H(\theta)F(\theta)W-W^H F^H(0)F(0)W$, $$u(W) = \frac{W^H W}{N} \geq Pe,$$

v(W) is $SPR-\int_a^\pi W^H F^H(\theta)F(\theta)Wd\theta - \int_{-\pi}^b W^H F^H(\theta)F(\theta)Wd\theta$, and $\eta(\theta)$, $\mu$, and $\xi$ are respectively penalty factors of $g(W,\theta)$, u(W), and v(W); and a second determining unit 30315, configured to determine that the model for the target mathematical optimization problem is min wL(W), where min wL(W) is a minimum value of L(W).

Figure 9:
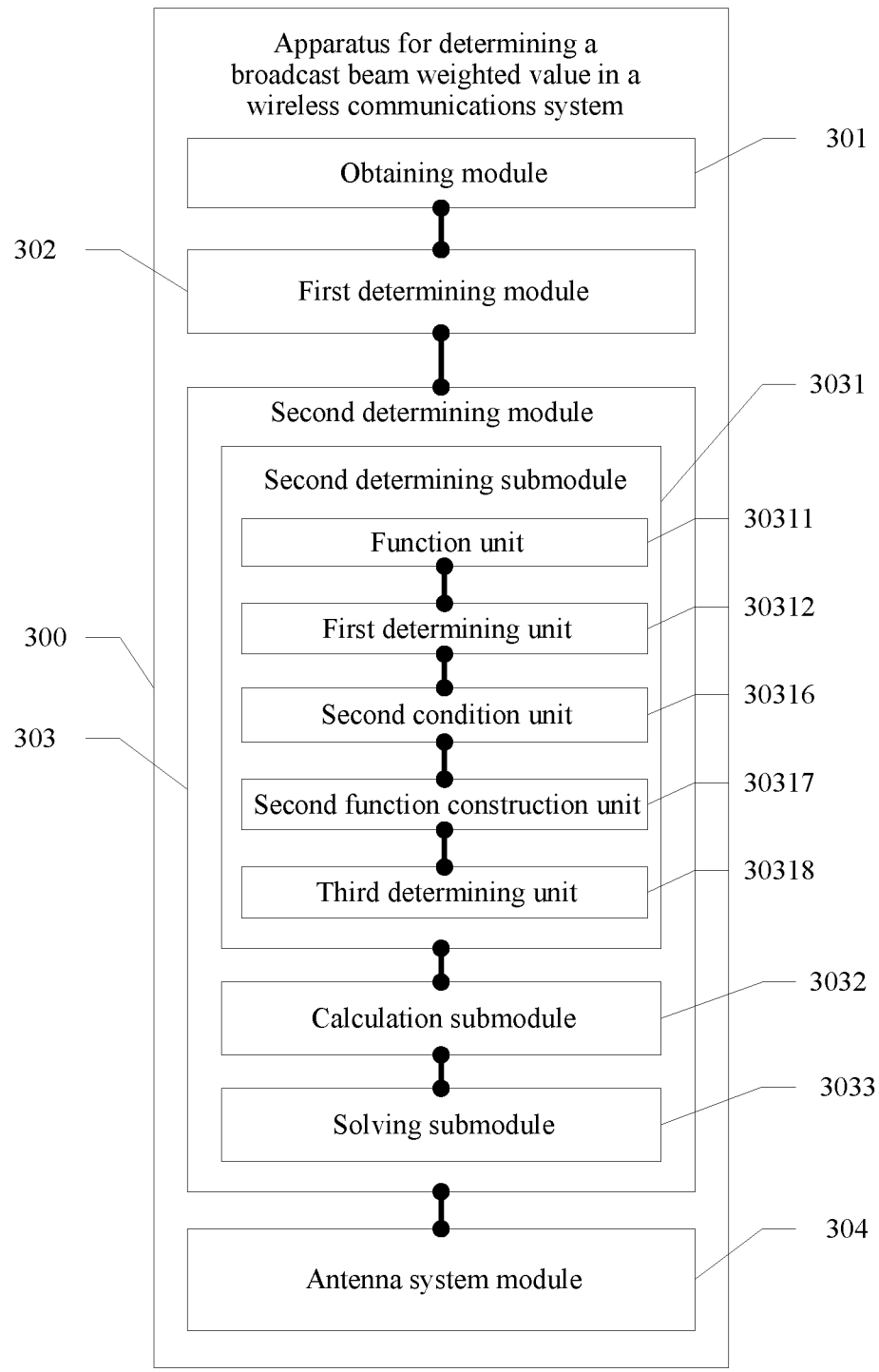
FIG. 9 is a schematic diagram of another embodiment of an apparatus for determining a broadcast beam weighted value in a wireless communications system according to an embodiment of this application.

Referring to FIG. 9, the second determining submodule 3031 further includes:

a second condition unit 30316, configured to set W in f(W) to meet $2W^H F^H(\theta)F(\theta)W-W^H F^H(0)F(0)W \geq 0$, where $a \leq \theta \leq b$;

a second function construction unit 30317, configured to construct a penalty function $L(W)=f(W)+\int_a^b \eta(\theta)g(W,\theta)d\theta$, where $g(W,\theta)=2W^H F^H(\theta)F(\theta)W - W^H F^H(0)F(0)W$, and $\eta(\theta)$ is a penalty factor of $g(W,\theta)$; and a third determining unit 30318, configured to determine that the model for the target mathematical optimization problem is min wL(W), where min wL(W) is a minimum value of L(W).

Figure 10:
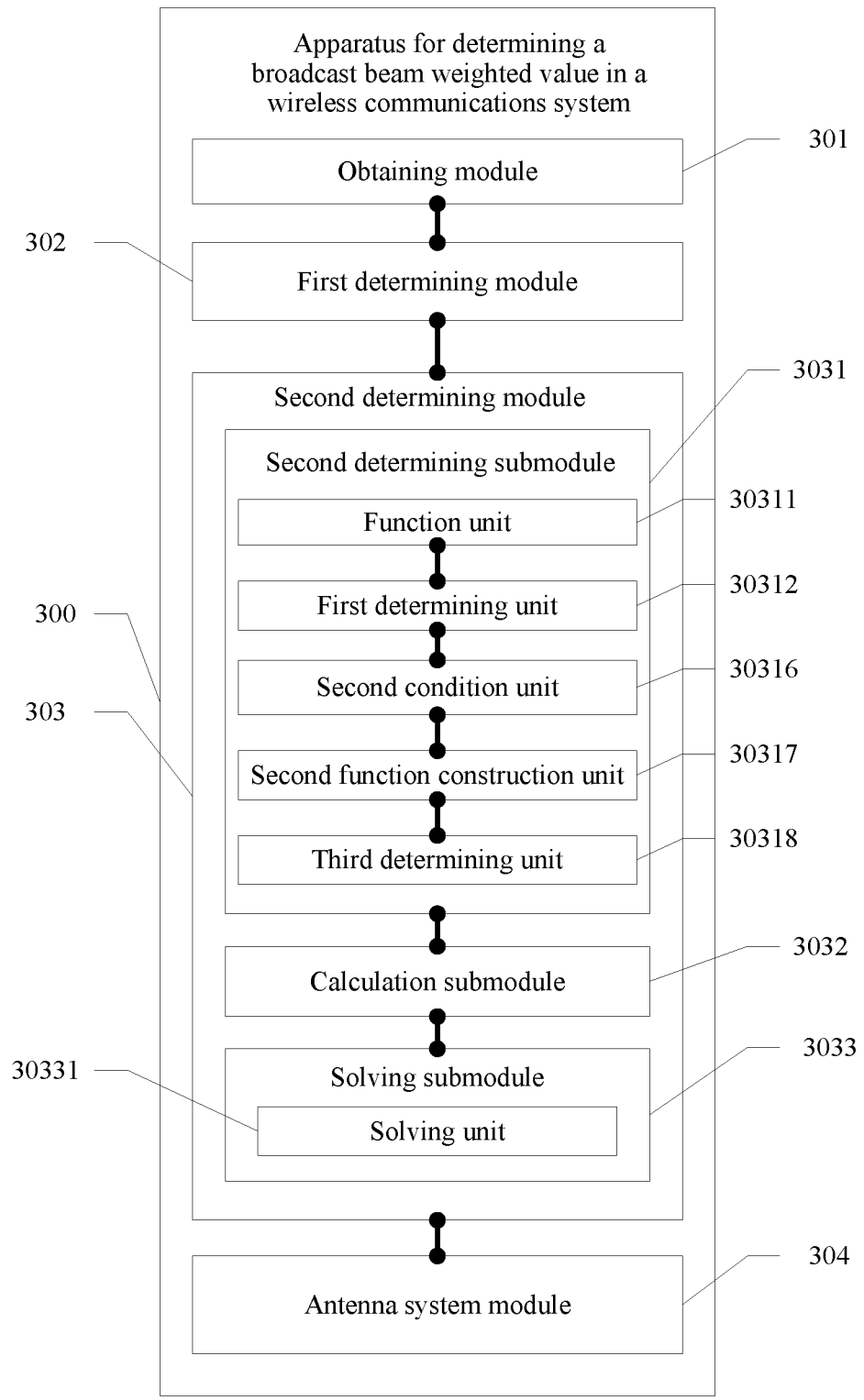
FIG. 10 is a schematic diagram of another embodiment of an apparatus for determining a broadcast beam weighted value in a wireless communications system according to an embodiment of this application.

Referring to FIG. 10, the solving submodule 3033 includes:

a solving unit 30331, configured to solve the target mathematical optimization problem by using a simplex search method, to obtain the broadcast beam weighted value.

Figure 11:
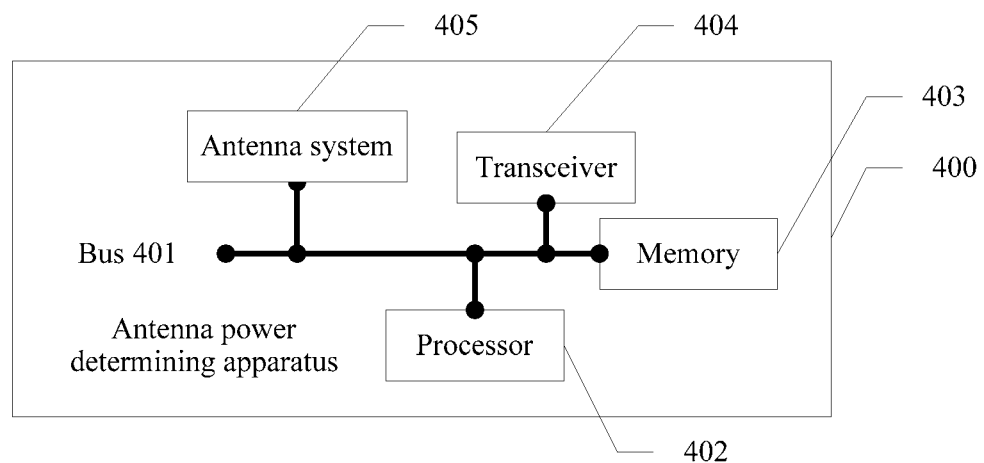
FIG. 11 is a schematic diagram of an embodiment of an apparatus for determining a broadcast beam weighted value in a wireless communications system according to an embodiment of this application.

Referring to FIG. 11, an embodiment of this application further provides an apparatus 400 for determining a broadcast beam weighted value in a wireless communications system, including:

a bus 401, a processor 402, a memory 403, a transceiver 404, and an antenna system 405.

The bus 401 is configured to be connected to the processor 402, the memory 403, the transceiver 404, and the antenna system 405.

The transceiver 404 is configured to obtain an angle path loss spectrum of a target cell at a current moment, where the angle path loss spectrum includes signal path loss values of a target base station in the target cell in a plurality of directions.

The transceiver 404 may include a communications interface between the processor 402 and a standard communications subsystem.

The transceiver 404 may further include a communications interface of the EIA-RS-232C standard, namely, a communications interface of the serial binary data interchange interface technology standard between data terminal equipment (DTE for short) and data circuit-terminating equipment (DCE for short), or may include a communications interface of the RS-485 protocol. This is not limited herein.

The processor 402 is configured to: determine a beam angle power spectrum based on the angle path loss spectrum, where the beam angle power spectrum includes signal transmit powers of the target base station in the plurality of directions, and in the beam angle power spectrum, a signal transmit power in a direction with a relatively large signal path loss value in the angle path loss spectrum is relatively large; and determine a broadcast beam weighted value based on the beam angle power spectrum.

The processor 402 may be a central processing unit (CPU for short), a network processor (NP for short), or a combination of a CPU and an NP.

The processor 402 may further include a hardware chip. The hardware chip may be an application-specific integrated circuit (ASIC for short), a programmable logic device (PLD for short), or a combination thereof. The PLD may be a complex programmable logic device (CPLD for short), a field-programmable gate array (FPGA for short), generic array logic (GAL for short), or any combination thereof.

The antenna system 405 is configured to form a target broadcast beam based on the broadcast beam weighted value.

The memory 403 is configured to store a program, the angle path loss spectrum, and the beam angle power spectrum.

The memory 403 may include a volatile memory, for example, a random-access memory (RAM for short). Alternatively, the memory 403 may include a nonvolatile memory, for example, a flash memory, a hard disk drive (HDD for short), or a solid state drive (SSD for short). Alternatively, the memory 403 may include a combination of the foregoing types of memories. This is not limited herein.

Optionally, the memory 403 may be further configured to store a program instruction. The processor 402 may invoke the program instruction stored in the memory 403, to perform one or more steps or an optional implementation in the embodiment shown in FIG. 2, to implement a function of the foregoing method.

All or some of the foregoing embodiments may be implemented by using software, hardware, firmware, or any combination thereof. When software is used to implement the embodiments, the embodiments may be implemented completely or partially in a form of a computer program product.

The computer program product includes one or more computer instructions. When the computer program instructions are loaded and executed on a computer, the procedure or functions according to the embodiments of the present invention are all or partially generated. The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any available medium accessible by the computer, or a data storage device, such as a server or a data center, integrating one or more available media. The available medium may be a magnetic medium (for example, a floppy disk, a hard disk, or a magnetic tape), an optical medium (for example, a DVD), a semiconductor medium (for example, a solid state disk Solid State Disk (SSD)), or the like.

It may be clearly understood by persons skilled in the art that for the purpose of convenient and brief description, for a detailed working process of the foregoing system, apparatus, and unit, reference may be made to a corresponding process in the foregoing method embodiments, and details are not described herein again.

In the several embodiments provided in this application, it should be understood that the disclosed system, apparatus, and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electrical, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of the embodiments.

In addition, functional units in the embodiments of this application may be integrated into one processing unit, or each of the units may exist alone physically, or two or more units may be integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions of this application essentially, or the part contributing to the prior art, or all or some of the technical solutions may be implemented in the form of a software product. The computer software product is stored in a storage medium and includes several instructions for instructing a computer device (which may be a personal computer, a server, a network device, or the like) to perform all or some of the steps of the methods described in the embodiments of this application. The foregoing storage medium includes: any medium that can store program code, for example, a USB flash drive, a removable hard disk, a read-only memory (ROM), a random access memory (RAM), a magnetic disk, or an optical disc.

The foregoing embodiments are merely intended for describing the technical solutions of this application, but not for limiting this application. Although this application is described in detail with reference to the foregoing embodiments, persons of ordinary skill in the art should understand that they may still make modifications to the technical solutions described in the foregoing embodiments or make equivalent replacements to some technical features thereof, without departing from the spirit and scope of the technical solutions of the embodiments of this application.

What is claimed is:

1. A method for determining a broadcast beam weighted value in a wireless communications system, applied to an apparatus comprising a processor, a memory, a receiver, a transmitter and an antenna system which are connected by a bus, the method comprising:
   obtaining an angle path loss spectrum $P(\theta)$ of a target cell at a current moment by obtaining a free space path loss function FreeSpacePL(d), obtaining a location path loss value $PL(\theta,d)$ of the target cell at the current moment and determining that the angle path loss spectrum $P(\theta)$ is equal to $\text{Max}_{0 \leq a \leq r}[\text{FreeSpacePL}(d)-PL(\theta,d)]$,
      wherein r is a maximum radius of the cell,
      wherein a value of FreeSpacePL(d) is a signal path loss value of a signal transmitted by a signal transmission apparatus in response to a distance between a signal receiving apparatus and the signal transmission apparatus being d in an unblocked cell,
      wherein a value of $PL(\theta,d)$ is a signal path loss value of a signal transmitted by the target base station in response to a direction of a receiving apparatus relative to the target base station being $\theta$ and a distance between the receiving apparatus and the target base station being d, and $\theta$ indicates the plurality of directions, and
      wherein the angle path loss spectrum comprises signal path loss values of a target base station in the target cell in a plurality of directions;
   determining, by the processor, a beam angle power spectrum based on the angle path loss spectrum, wherein the beam angle power spectrum comprises signal transmit powers of the target base station in the plurality of directions,
      wherein in the beam angle power spectrum, a signal transmit power in a first direction in the angle path loss spectrum is larger than in a second direction in the angle path loss spectrum, and
      wherein a signal path loss value in the first direction is relatively larger than a signal path loss value in the second direction;
   determining a broadcast beam weighted value based on the beam angle power spectrum; and
   forming a target broadcast beam based on the broadcast beam weighted value.

2. The method according to claim 1, wherein determining the beam angle power spectrum $P^*(\theta)$ based on the angle path loss spectrum $P(\theta)$ comprises:
   determining that the beam angle power spectrum $P^*(\theta)$ is equal to the angle path loss spectrum $P(\theta)$ plus a constant value p, wherein p is greater than 0.

3. The method according to claim 1, wherein determining the broadcast beam weighted value based on the beam angle power spectrum comprises:
   determining a model for a target mathematical optimization problem;
   substituting $P^*(\theta)$ into the model for the target mathematical optimization problem, to obtain the target mathematical optimization problem; and
   solving the target mathematical optimization problem to obtain the broadcast beam weighted value.

4. The method according to claim 3, wherein determining the model for the target mathematical optimization problem comprises:
   setting a function $f(W)=\int_a^b \|W^H F^H(\theta)F(\theta)W-P^*(\theta)-\text{Pr}\|_2^2 d\theta$,
      wherein Pr is a weak coverage power threshold, W is a vector expression of the broadcast beam weighted value, $F(\theta)$ is an array directivity pattern of the wireless communications system, $W^H$ is a conjugate transpose of W, $F^H(\theta)$ is a conjugate transpose of $F(\theta)$, a and b are respectively coverage areas of the target broadcast beam in the cell, $a \leq b$, $\|W^H F^H(\theta)F(\theta)W-P^*(\theta)-\text{Pr}\|_2^2$ is the square of a 2-norm of $W^H F^H(\theta)F(\theta)W-P^*(\theta)-\text{Pr}$, and f(W) is a calculus value of $W^H F^H(\theta)F(\theta)W-P^*(\theta)-\text{Pr}$; and
   determining that the model for the target mathematical optimization problem is min wf(W), wherein min wf(W) is a minimum value of f(W).

5. The method according to claim 4, wherein after setting the function $f(W)=\int_a^b \|W^H F^H(\theta)F(\theta)W-P^*(\theta)-\text{Pr}\|_2^2 d\theta$, the method further comprises:
   setting W in f(W) to meet $2W^H F^H(\theta)F(\theta)W-W^H F^H(0)F(0)W \geq 0$, wherein $a \leq \theta \leq b$, $$\frac{W^H W}{N} \geq Pe,$$

$\int_a^\pi W^H F^H(\theta)F(\theta)W d\theta + \int_{-\pi}^b W^H F^H(\theta)F(\theta)W d\theta \leq SPR$, and N is a quantity of dimensions of W;
   constructing a penalty function $L(W)=f(W)+\int_a^b \eta(\theta)g(W,\theta)d\theta + \mu \cdot u(W) + \xi \cdot v(W)$, wherein Pe is a power efficiency threshold, SPR is a sector power ratio threshold, $g(W,\theta)=2W^H F^H(\theta)F(\theta)W-W^H F^H(0)F(0)W$, $$u(W) = \frac{W^H W}{N} \geq Pe,$$

v(W) is SPR$-\int_a^\pi W^H F^H(\theta)F(\theta)Wd\theta-\int_{-\pi}^b W^H F^H(\theta)F(\theta)Wd\theta$, and $\eta(\theta)$, $\mu$, and $\xi$ are respectively penalty factors of $g(W,\theta)$, $u(W)$, and $v(W)$; and determining that the model for the target mathematical optimization problem is min wL(W), wherein min wL(W) is a minimum value of L(W).

6. The method according to claim 4, wherein after setting the function $f(W)=\int_a^b \|W^H F^H(\theta)F(\theta)W-P^*(\theta)-Pr\|_2^2 d\theta$, the method further comprises:

setting W in f(W) to meet $2W^H F^H(\theta)F(\theta)W-W^H F^H(0)F(0)W \geq 0$, wherein $a \leq \theta \leq b$;

constructing a penalty function $L(W)=f(W)+\int_a^b \eta(\theta)g(W,\theta)d\theta$, wherein $g(W,\theta)=2W^H F^H(\theta)F(\theta)W-W^H F^H(0)F(0)W$, and $\eta(\theta)$ is a penalty factor of $g(W,\theta)$; and determining that the model for the target mathematical optimization problem is min wL(W), wherein min wL(W) is a minimum value of L(W).

7. The method according to claim 3, wherein solving the target mathematical optimization problem to obtain the broadcast beam weighted value comprises:

solving the target mathematical optimization problem using a simplex search method, to obtain the broadcast beam weighted value.

8. An apparatus for determining a broadcast beam weighted value in a wireless communications system, comprising:

a bus, a processor, a memory, a transmitter, a receiver, and an antenna system, wherein the bus is configured to be connected to the processor, the memory, the transmitter, the receiver, and the antenna system;

the receiver is configured to cooperate with the processor to obtain an angle path loss spectrum $P(\theta)$ of a target cell at a current moment by obtaining a free space path loss function FreeSpacePL(d) and obtaining a location path loss value $PL(\theta,d)$ of the target cell at the current moment, wherein r is a maximum radius of the cell, wherein a value of FreeSpacePL(d) is a signal path loss value of a signal transmitted by a signal transmission apparatus in response to a distance between a signal receiving apparatus and the signal transmission apparatus being d in an unblocked cell, wherein a value of $PL(\theta,d)$ is a signal path loss value of a signal transmitted by the target base station in response to a direction of a receiving apparatus relative to the target base station being $\theta$ and a distance between the receiving apparatus and the target base station being d, and $\theta$ indicates the plurality of directions, and wherein the angle path loss spectrum comprises signal path loss values of a target base station in the target cell in a plurality of directions;

the processor is configured to determine a beam angle power spectrum based on the angle path loss spectrum and determine that the angle path loss spectrum $P(\theta)$ is equal to $Max_{0 \leq d \leq r}[FreeSpacePL(d)-PL(\theta,d)]$, wherein the beam angle power spectrum comprises signal transmit powers of the target base station in the plurality of directions, wherein, in the beam angle power spectrum, a signal transmit power in a first direction in the angle path loss spectrum is larger than in a second direction in the angle path loss spectrum, and wherein a signal path loss value in the first direction is relatively larger than a signal path loss value in the second direction; and determine a broadcast beam weighted value based on the beam angle power spectrum;

the antenna system is configured to form a target broadcast beam based on the broadcast beam weighted value; and the memory is configured to store a program, the angle path loss spectrum, and the beam angle power spectrum.

9. The apparatus according to claim 8, wherein the processor is further configured to:

determine that the beam angle power spectrum $P^*(\theta)$ is equal to the angle path loss spectrum $P(\theta)$ plus a constant value p, wherein p is greater than 0.

10. The apparatus according to claim 8, wherein the processor is further configured to:

determine a model for a target mathematical optimization problem;

substitute $P^*(\theta)$ into the model for the target mathematical optimization problem, to obtain the target mathematical optimization problem; and solve the target mathematical optimization problem to obtain the broadcast beam weighted value.

11. The apparatus according to claim 10, wherein the further processor is configured to:

set a function $f(W)=\int_a^b \|W^H F^H(\theta)F(\theta)W-P^*(\theta)-Pr\|_2^2 d\theta$, wherein Pr is a weak coverage power threshold, W is a vector expression of the broadcast beam weighted value, $F(\theta)$ is an array directivity pattern of the wireless communications system, $W^H$ is a conjugate transpose of W, $F^H(\theta)$ is a conjugate transpose of $F(\theta)$, a and b are respectively coverage areas of the target broadcast beam in the cell, $a \leq b$, $\|W^H F^H(\theta)F(\theta)W-P^*(\theta)-Pr\|_2^2$ is the square of a 2-norm of $W^H F^H(\theta)F(\theta)W-P^*(\theta)-Pr$, and f(W) is a calculus value of $W^H F^H(\theta)F(\theta)W-P^*(\theta)-Pr$; and determine that the model for the target mathematical optimization problem is min wf(W), wherein min wf(W) is a minimum value of f(W).

12. The apparatus according to claim 11, wherein the processor is further configured to:

set W in f(W) to meet $2W^H F^H(\theta)F(\theta)W-W^H F^H(0)F(0)W \geq 0$, wherein $a \leq \theta \leq b$, $$\frac{W^H W}{N} \geq Pe,$$

$\int_a^\pi W^H F^H(\theta)F(\theta)Wd\theta+\int_{-\pi}^b W^H F^H(\theta)F(\theta)Wd\theta \leq SPR$, and N is a quantity of dimensions of W;

construct a penalty function $L(W)=f(W)+\int_a^b \eta(\eta)g(W,\theta)d\theta+\mu \cdot u(W)+\xi \cdot v(W)$, wherein Pe is a power efficiency threshold, SPR is a sector power ratio threshold, $g(W,\theta)=2W^H F^H(\theta)F(\theta)W-W^H F^H(0)F(0)W$, $$u(W) = \frac{W^H W}{N} \geq Pe,$$

v(W) is SPR$-\int_a^\pi W^H F^H(\theta)F(\theta)Wd\theta-\int_{-\pi}^b W^H F^H(\theta)F(\theta)Wd\theta$, and $\eta(\theta)$, $\mu$, and $\xi$ are respectively penalty factors of $g(W,\theta)$ u(W), and v(W); and determine that the model for the target mathematical optimization problem is min wL(W), wherein min wL(W) is a minimum value of L(W).

13. The apparatus according to claim 11, wherein the processor is further configured to:
  set W in f(W) to meet $2W^H F^H(\theta)F(\theta)W - W^H F^H(0)F(0)W \geq 0$, wherein $a \leq \theta \leq b$;
  construct a penalty function $L(W)=f(W)+\int_a^b \eta(\theta)g(W,\theta)d\theta$, wherein $g(W,\theta)=2W^H F^H(\theta)F(\theta)W - W^H F^H(0)F(0)W$, and $\eta(\theta)$ is a penalty factor of $g(W,\theta)$; and
  determine that the model for the target mathematical optimization problem is min wL(W), wherein min wL(W) is a minimum value of L(W).

14. The apparatus according to claim 10, wherein the processor is further configured to:
  solve the target mathematical optimization problem by using a simplex search method, to obtain the broadcast beam weighted value.

15. A non-transitory computer-readable storage medium, comprising processor-executable instructions, which when executed cause a processor of a computer to implement operations including:
  obtaining an angle path loss spectrum $P(\theta)$ of a target cell at a current moment by obtaining a free space path loss function FreeSpacePL(d), obtaining a location path loss value $PL(\theta,d)$ of the target cell at the current moment and determining that the angle path loss spectrum $P(\theta)$ is equal to $\text{Max}_{0 \leq d \leq r}[\text{FreeSpacePL}(d) - PL(\theta,d)]$,
  wherein r is a maximum radius of the cell,
  wherein a value of FreeSpacePL(d) is a signal path loss value of a signal transmitted by a signal transmission apparatus in response to a distance between a signal receiving apparatus and the signal transmission apparatus being d in an unblocked cell,
  wherein a value of $PL(\theta,d)$ is a signal path loss value of a signal transmitted by the target base station in response a direction of a receiving apparatus relative to the target base station being $\theta$ and a distance between the receiving apparatus and the target base station being d, and $\theta$ indicates the plurality of directions,
  wherein the angle path loss spectrum comprises signal path loss values of a target base station in the target cell in a plurality of directions;
  determining a beam angle power spectrum based on the angle path loss spectrum, wherein the beam angle power spectrum comprises signal transmit powers of the target base station in the plurality of directions, and in the beam angle power spectrum, a signal transmit power in a direction with a relatively large signal path loss value in the angle path loss spectrum is relatively large;
  determining a broadcast beam weighted value based on the beam angle power spectrum; and
  forming a target broadcast beam based on the broadcast beam weighted value.

16. The non-transitory computer-readable storage medium according to claim 15, wherein the operation of determining the beam angle power spectrum $P^*(\theta)$ based on the angle path loss spectrum $P(\theta)$ comprises:
  determining that the beam angle power spectrum $P^*(\theta)$ is equal to the angle path loss spectrum $P(\theta)$ plus a constant value p, wherein p is greater than 0.

17. The non-transitory computer-readable storage medium according to claim 15, wherein the operation of determining the broadcast beam weighted value based on the beam angle power spectrum comprises:
  determining a model for a target mathematical optimization problem;
  substituting $P^*(\theta)$ into the model for the target mathematical optimization problem, to obtain the target mathematical optimization problem; and
  solving the target mathematical optimization problem to obtain the broadcast beam weighted value.

* * * * *